(12) United States Patent
Boudreaux et al.

(10) Patent No.: US 9,866,047 B2
(45) Date of Patent: *Jan. 9, 2018

(54) MULTI-BATTERY AND MULTI-DEVICE CONNECTION SYSTEM

(71) Applicant: Connect-Ease L. L. C., Eden Prairie, MN (US)

(72) Inventors: Burt A Boudreaux, Eden Prairie, MN (US); Calvin D Munkvold, Eden Prairie, MN (US)

(73) Assignee: Connect-Ease L.L.C., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,612

(22) Filed: Dec. 17, 2016

(65) Prior Publication Data

US 2017/0098899 A1  Apr. 6, 2017

Related U.S. Application Data

(63) Continuation-in-part of application No. 14/671,425, filed on Mar. 27, 2015, now Pat. No. 9,559,473.

(Continued)

(51) Int. Cl.
*H01R 11/00* (2006.01)
*H02J 7/00* (2006.01)
(Continued)

(52) U.S. Cl.
CPC ........... *H02J 7/0045* (2013.01); *H01M 2/206* (2013.01); *H01R 11/288* (2013.01); *H01R 25/003* (2013.01); *H01R 31/02* (2013.01)

(58) Field of Classification Search
CPC ... H01R 11/288; H01R 11/282; H01R 11/287; H01R 11/281; H01R 31/06; H01R 2201/26; H01R 24/20; H02J 7/0042
See application file for complete search history.

(56) References Cited

U.S. PATENT DOCUMENTS 4,081,738 A   3/1978 Roller
4,082,401 A   4/1978 Kruszecki
(Continued)

FOREIGN PATENT DOCUMENTS

CA   1098962 A1   4/1981
EP   1970244 A2   9/2008
(Continued)

OTHER PUBLICATIONS

Tower Hobbies; Castle Creations Series Connector 10 Gauge Deans; website; http://www3.towerhobbies.com/cgi-bin/wti0001p?&I=LXYHX5#resources.
(Continued)

*Primary Examiner* — Xuong Chung Trans
(74) *Attorney, Agent, or Firm* — Grumbles Law, PLLC; Brittany Nanzig

(57) ABSTRACT

An electrical connection system that connects and disconnects a plurality of supply circuits. More specifically, a connection system that can quickly connect two or more batteries in series or in parallel by connecting a wire bridge system to two or more mated battery side connectors. Alternatively, the connection system can quickly connect a plurality of devices to one battery connection point by connecting a multi-device connector to a mated battery side connector.

18 Claims, 30 Drawing Sheets

Related U.S. Application Data

(60) Provisional application No. 61/979,701, filed on Apr. 15, 2014.

(51) Int. Cl.
*H01M 2/20* (2006.01)
*H01R 11/28* (2006.01)
*H01R 25/00* (2006.01)
*H01R 31/02* (2006.01)

(56) References Cited

U.S. PATENT DOCUMENTS

| | | | |
|---|---|---|---|
| 4,272,142 A | | 6/1981 | Zapf |
| D281,314 S | | 11/1985 | Bates |
| 4,649,332 A | * | 3/1987 | Bell ............... H02J 7/0024 320/117 |
| 4,726,786 A | | 2/1988 | Hill |
| 4,906,205 A | | 3/1990 | Viles |
| 4,999,562 A | | 3/1991 | Hill |
| 5,086,208 A | | 2/1992 | Habermann |
| 5,225,761 A | | 7/1993 | Albright |
| 5,233,282 A | | 8/1993 | Iwashita |
| 5,795,182 A | | 8/1998 | Jacob |
| 5,859,517 A | | 1/1999 | DePasqua |
| 5,896,022 A | * | 4/1999 | Jacobs, Sr. .......... H02J 7/1423 320/103 |
| 5,986,431 A | | 11/1999 | Hayes |
| 6,031,355 A | * | 2/2000 | Rich ............... H01M 10/0445 320/117 |
| 6,049,141 A | | 4/2000 | Sieminski |
| 6,123,576 A | | 9/2000 | James |
| 6,152,784 A | | 11/2000 | Pyles |
| 6,160,373 A | | 12/2000 | Dunn |
| 6,281,600 B1 | | 8/2001 | Hough |
| 6,319,055 B1 | | 11/2001 | Conner, Jr. |
| 6,430,692 B1 | | 8/2002 | Kimble |
| 7,008,259 B2 | | 3/2006 | Agnew |
| 7,033,209 B2 | | 4/2006 | Swiatek |
| 7,193,393 B1 | | 3/2007 | Payne |
| 7,675,261 B2 | | 3/2010 | Elder |
| 8,026,446 B2 | | 9/2011 | Oriet |
| 9,153,981 B2 | * | 10/2015 | Back ............... H02J 7/0042 |
| 2002/0155752 A1 | | 10/2002 | Winkle et al. |
| 2005/0040788 A1 | | 2/2005 | Tseng |
| 2006/0178028 A1 | | 8/2006 | Swiatek |
| 2009/0091292 A1 | | 4/2009 | Nippear |
| 2012/0091944 A1 | | 4/2012 | Rogers |
| 2012/0295456 A1 | | 11/2012 | Severac |

FOREIGN PATENT DOCUMENTS

| | | |
|---|---|---|
| WO | 2006020537 A2 | 2/2006 |
| WO | 2013138380 A2 | 9/2013 |

OTHER PUBLICATIONS trollingmotors.net; Trolling Motor Quick Connect; 2014; http://www.trollingmotors.net/trolling-motor-quick-connect.
Wes Wiedmaier; Marine Battery Wiring 101; 1996; http://www.cabelas.com/product/Marine-Battery-Wiring/531785.uts.
trollingmotors.net; Trolling Motor Plug Overview; 2014; http://www.trollingmotors.net/trolling-motor-plug.
Thermodyne-Systems; Info on parallel and series wiring for 12 and 24 volt batteries; 2011; http://www.hydrogenappliances.com/wiring.html.
DragonByte Technologies Ltd; Terrova 80 problems; May 16, 2012; http://www.crappie.com/crappie/fishing-electronics-and-photography/215753-terrova-80-problems/.
Pontoon Trolling Motor; Wiring 36 Volt Trolling Motor; 2014; http://www.pontoontrollingmotor.com/category/12-volt-trolling-motor/wiring-36-volt-trolling-motor/.
Yandina Ltd; How to Charge Your Trolling Battery from Your Outboard Engine; 2008; http://www.yandina.com/TrollBattery.htm.
Powerwerx; Fuse Holders, ATC Fuses, Circuit Breakers; 2011; http://www.powerwerx.com/fuses-circuit-protection/.
Powerwerx; OEM-T inline Powerpole splitter; 2012; http://www.powerwerx.com/adapter-cables/oem-t-inline-powerpole-splitter.html.
Powerwerx; Power Pole DC Power Distribution; 2011; http://www.powerwerx.com/powerpole-power-distribution/.

* cited by examiner

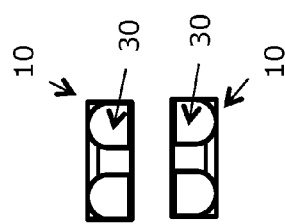
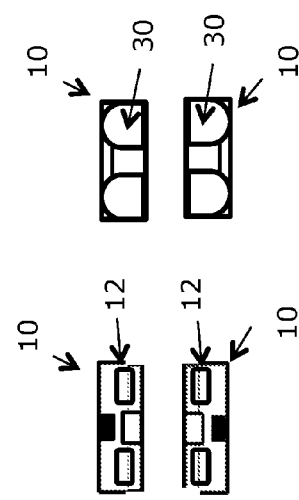
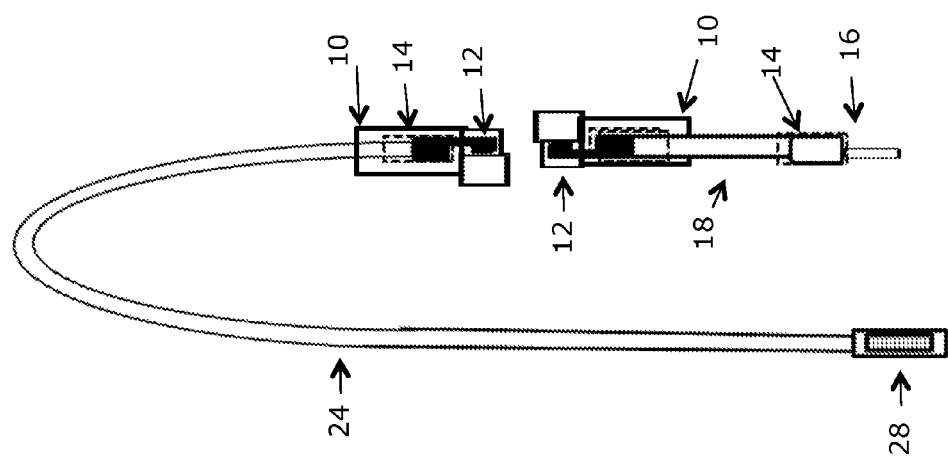

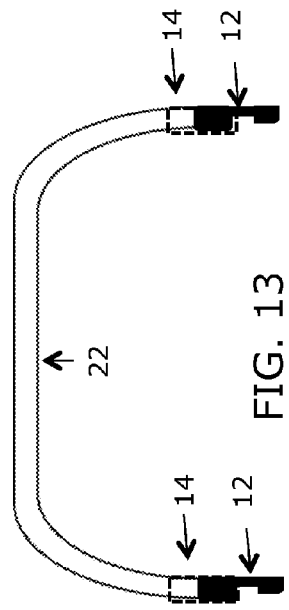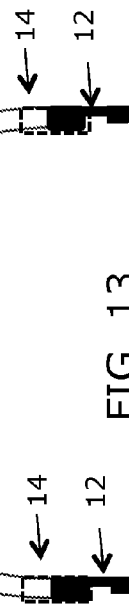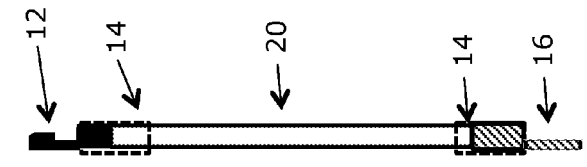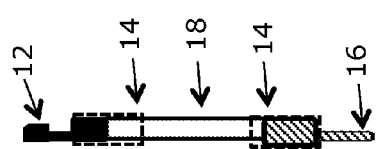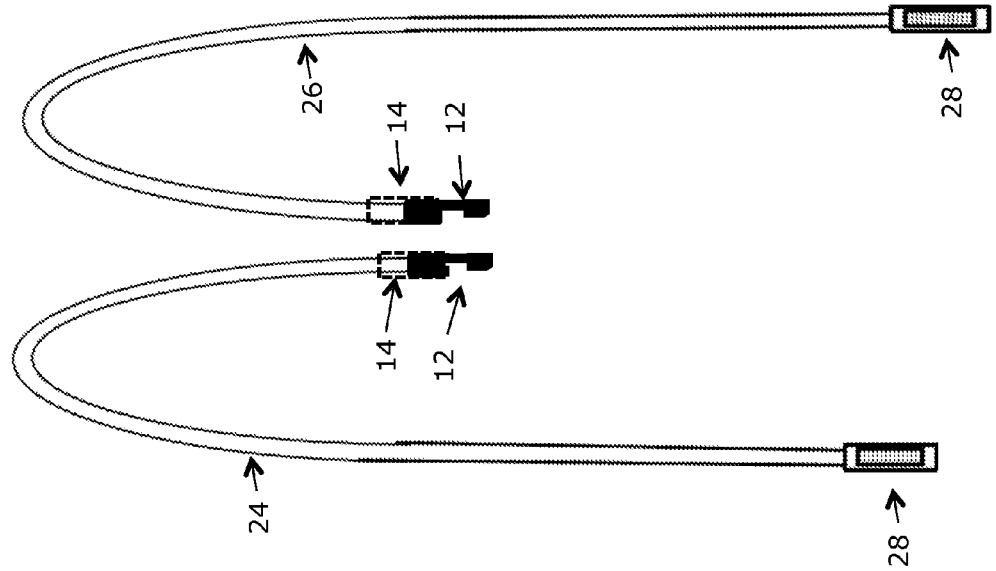

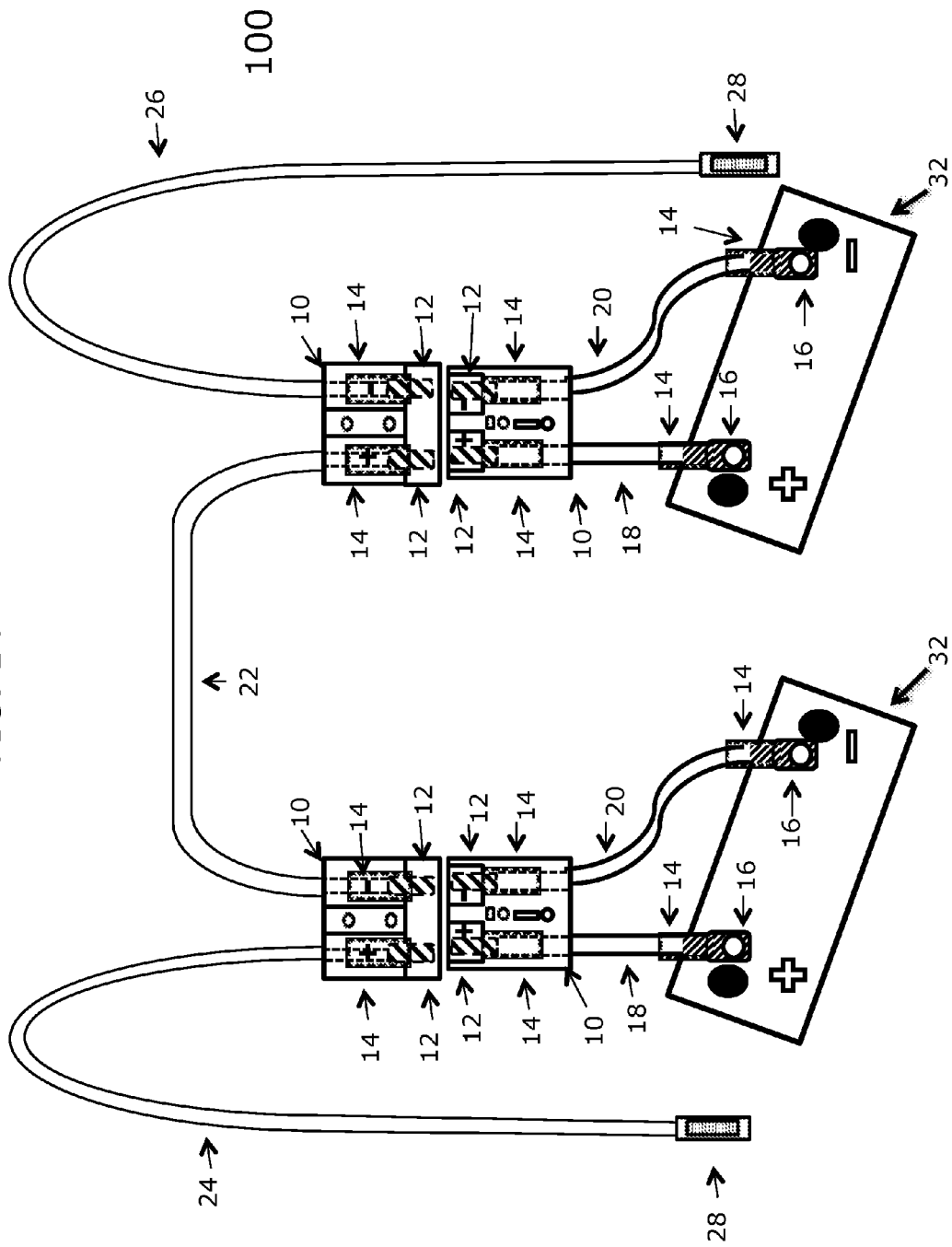

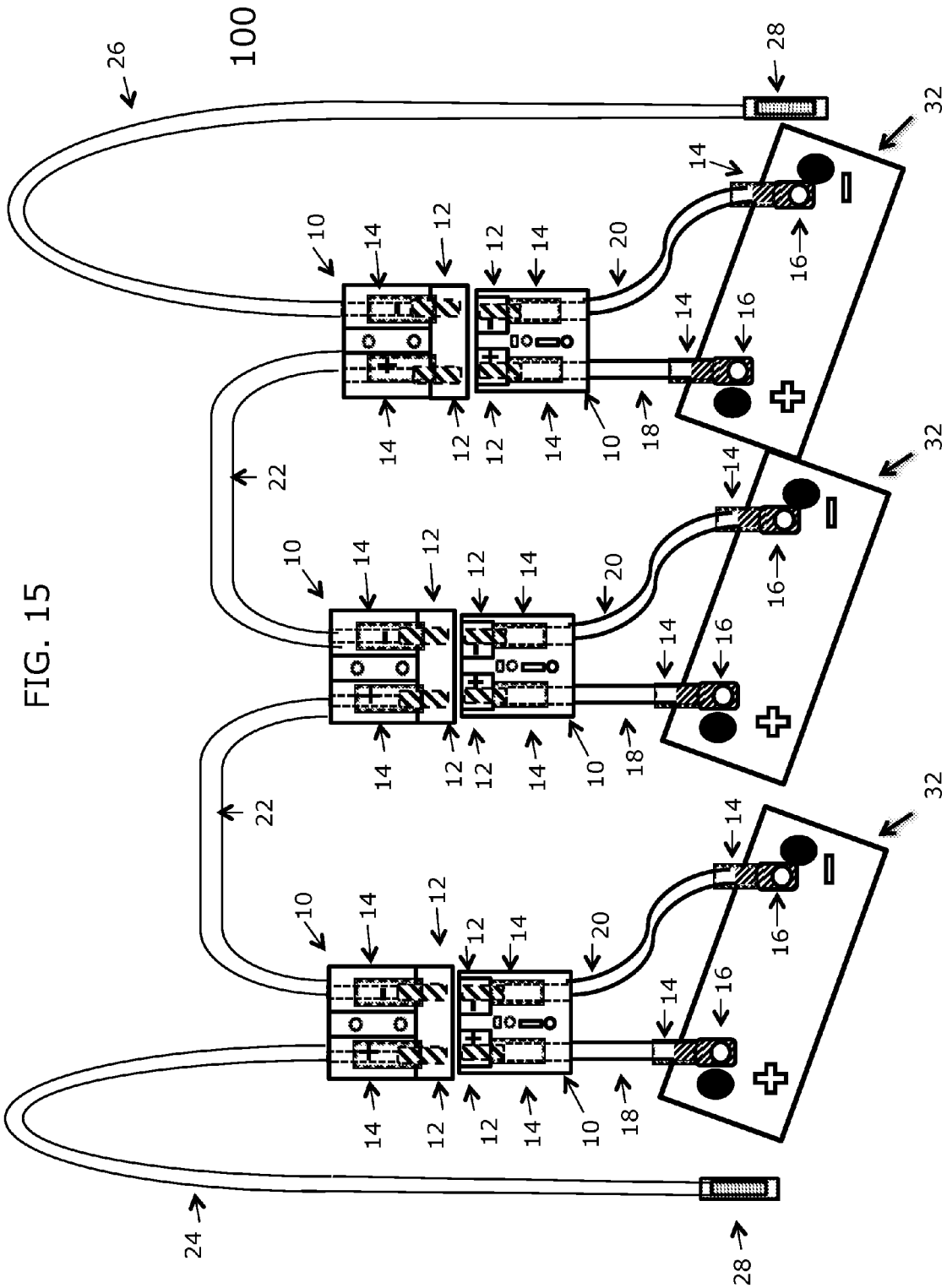

MULTI-BATTERY AND MULTI-DEVICE CONNECTION SYSTEM

CROSS-REFERENCE TO RELATED APPLICATIONS

This application is a continuation-in-part of U.S. patent application Ser. No. 14/671,425, filed on Mar. 27, 2015, titled MULTI-BATTERY AND MULTI-DEVICE CONNECTION SYSTEM, which claims the benefit of U.S. Provisional Application No. 61/979,701, filed on Apr. 15, 2014, titled MULTI-BATTERY CONNECTION SYSTEM AND METHOD.

FIELD OF THE DISCLOSURE

The present disclosure generally relates to the field of electrical connectors. More specifically, the present disclosure relates to the field of supply circuit connection and disconnection.

BACKGROUND OF THE INVENTION

Many people use devices that require a battery for energy, such as marine motors, recreational vehicles, all-terrain vehicles, golf carts, automobiles, heavy equipment, generators, agricultural equipment, and other industrial devices. For example, people who fish often use a trolling motor that requires a 12-volt battery to run. However, when extensive, continuous use of a motor, such as a trolling motor, is required, a single battery may run out of energy while the person still needs to use the motor. Fortunately, connecting two or more batteries can lengthen the battery life. However, connecting two batteries together is currently a confusing process and can lead to damage to the battery or other equipment. Additionally, it can lead to physical injury to the person attempting to connect the batteries. A system and method is needed that permits a user to efficiently, and safely, connect and disconnect extra batteries when extended battery life or increased voltage is required and that provides a user with the option to utilize a standard parallel voltage connection.

Additionally, there are a variety of situations in which people simultaneously run a plurality of devices that require a battery for power. For example, people who fish often use a trolling motor, depth finder, radio, running lights, and GPS, all of which require a 12-volt battery. Unfortunately, in order to connect a plurality of devices to a battery, each device must connect via its own independent wire lead, terminals, and independent fuse block. Additionally, even when turned off, connected devices may continue to drain the battery they are connected to. A system and method is needed where a user can efficiently, and safely, connect and disconnect a plurality of devices to a battery, and wherein no drain occurs to the battery when devices are connected, but not in use.

SUMMARY OF THE INVENTION

One example of the disclosed device is a connection system that can connect two batteries in series using a wire bridge system that is mated to a pair of connectors on each battery. The mated battery connectors can ensure a one-way connection and eliminate an incorrect connection, thus creating a quick and easy setup that is safe to use. For example, the present disclosure can be used to convert two 12-volt batteries into a 24-volt system. Additional bridging wire can also be utilized to convert three or more 12-volt batteries into a larger voltage system. For example, three 12-volt batteries can be connected in series to create a 36-volt system. In addition to creating a larger voltage system, the connectors can also include wire leads that are attached to the wire bridge system to create a 12-volt parallel connection.

A second example of the disclosed device is a connection system that can connect two or more batteries in parallel using a parallel wire bridge system that is mated to a pair of connectors on each battery. The mated battery connectors can ensure a one-way connection and eliminate an incorrect connection, thus creating a quick and easy setup that is safe to use. For example, the present disclosure can be used to convert two 12-volt batteries into a 12-volt system that lasts twice as a long a single 12-volt battery. Additional bridging wire can also be utilized to convert three or more 12-volt batteries into a larger capacity system. In addition to creating a larger capacity system, the connectors can also include wire leads that are attached to the bridge system to create a 12-volt parallel connection.

A third example of the disclosed device converts one 12-volt connection into a multi-device 12-volt system. This system includes two connection blocks that connect to each other, wherein a first connection block is mated to two sets of independent wire leads, each set combined into one connection point, and a second connection block is mated to two independent wires that both connect to a 12-volt battery. The connection blocks ensure a one-way connection and eliminate an incorrect connection, thus creating a quick and easy setup. The independent wire leads can be non-fused or can be fused together at the connection point on the connection block and can be of varying size and length. Therefore, one 12-volt battery connection can be connected to a plurality of devices from one connection point at the battery.

BRIEF DESCRIPTION OF THE DRAWINGS

FIG. 6 illustrates a side view of a portion of a wire bridge system and a mated battery side connector according to one embodiment of the present disclosure.

FIG. 7 illustrates a front view of top and bottom terminal connectors on a connection block according to one embodiment of the present disclosure.

FIG. 8 illustrates a front view of top and bottom terminal connector slots on a connection block according to one embodiment of the present disclosure.

FIG. 9 illustrates a side view of a wire lead according to one embodiment of the present disclosure.

FIG. 10 illustrates a side view of a wire lead according to one embodiment of the present disclosure.

FIG. 11 illustrates a side view of a mated battery side connector wire and terminal connector wire according to one embodiment of the present disclosure.

FIG. 12 illustrates a side view of a mated battery side connector wire and terminal connector wire according to one embodiment of the present disclosure.

FIG. 13 illustrates a side view of a bridging wire with terminal connectors according to one embodiment of the present disclosure.

FIG. 14 illustrates a top down view of the disclosed multi-battery series connection system connected to two batteries according to one embodiment of the present disclosure.

FIG. 15 illustrates a top down view of the disclosed multi-battery series connection system connected to three batteries according to one embodiment of the present disclosure.

DETAILED DESCRIPTION

Figure 1:
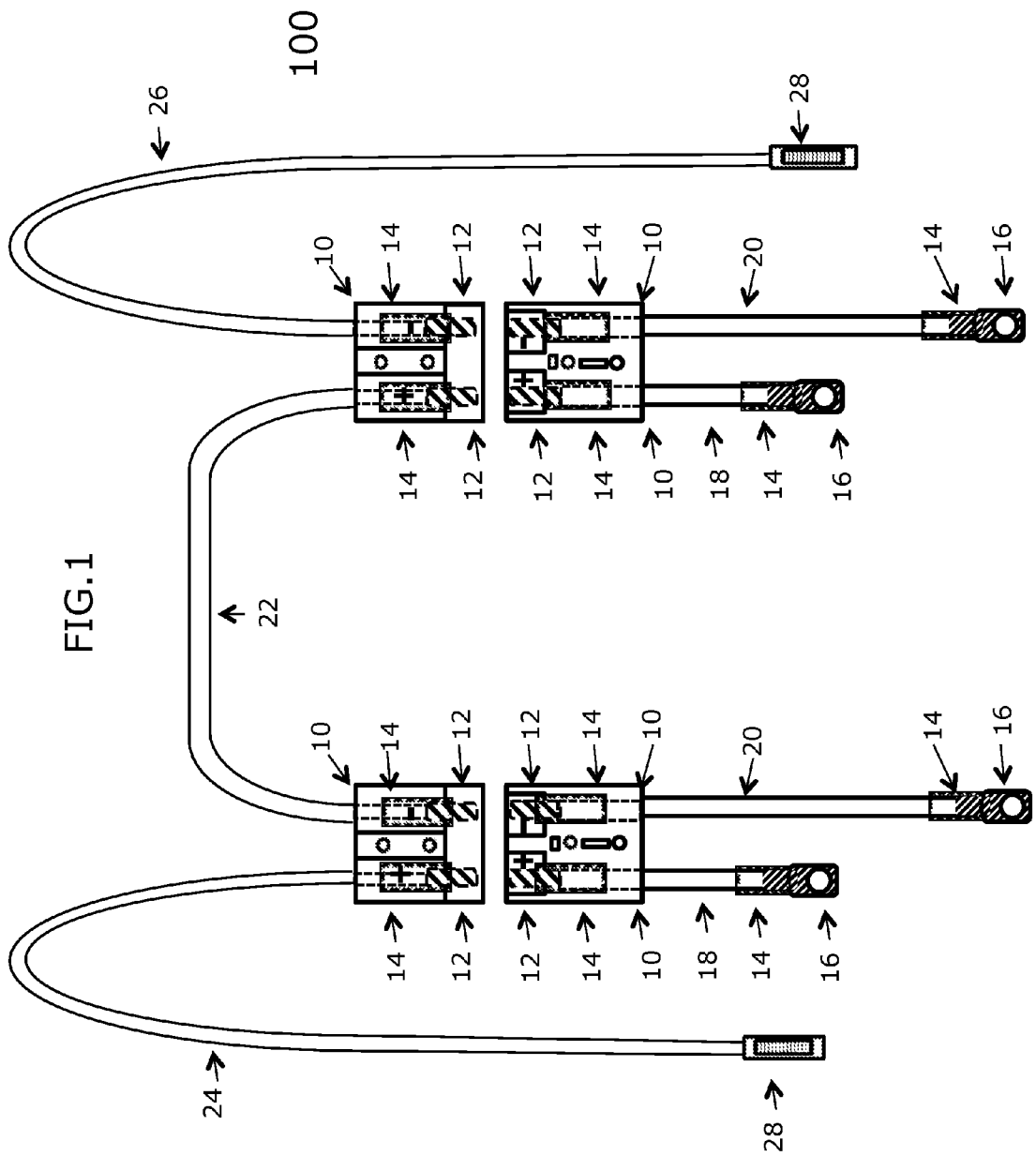
FIG. 1 illustrates a top down view of the disclosed multi-battery series connection system according to one embodiment of the present disclosure.

Various embodiments will be described in detail with references to drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover application or embodiments without departing from the spirit or scope of the claims attached hereto. Also, it is to be understood that the phraseology and terminology used herein are for the purpose of description and should not be regarded as limiting.

Multi-Battery Connection System: Series

Figure 2:
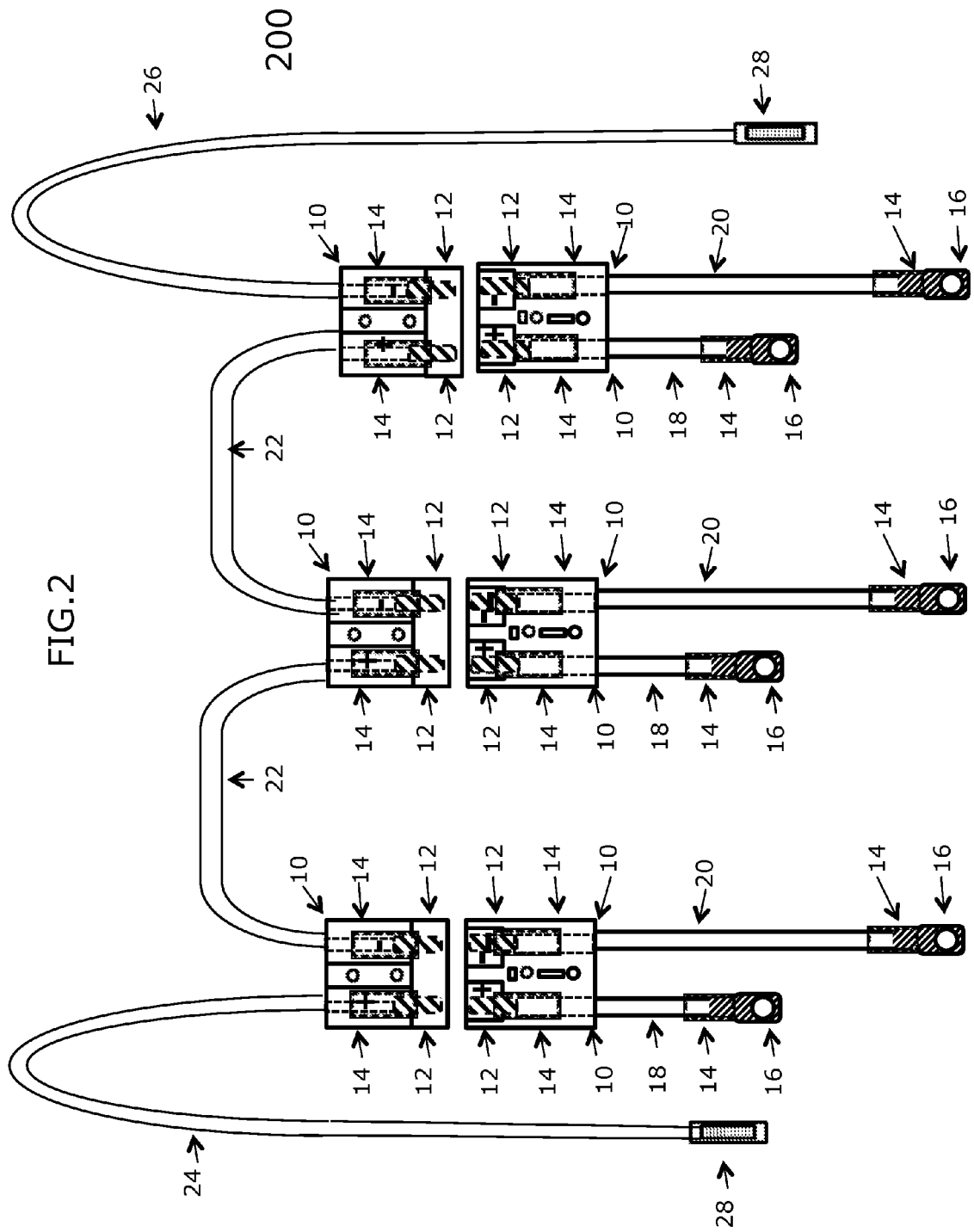
FIG. 2 illustrates a top down view of the disclosed multi-battery series connection system according to one embodiment of the present disclosure.
Figure 3:
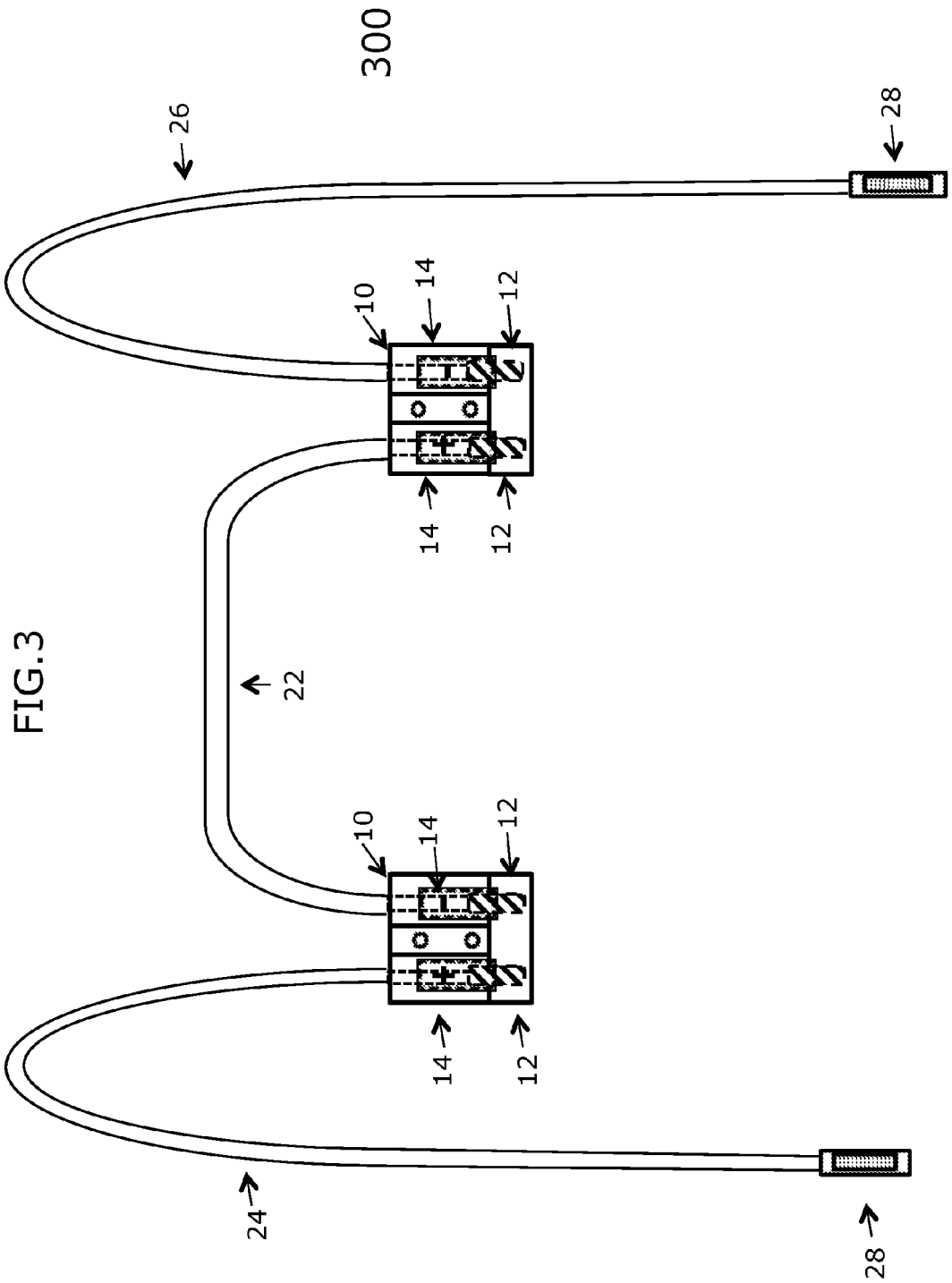
FIG. 3 illustrates a top down view of a series wire bridge system according to one embodiment of the present disclosure.
Figure 4:
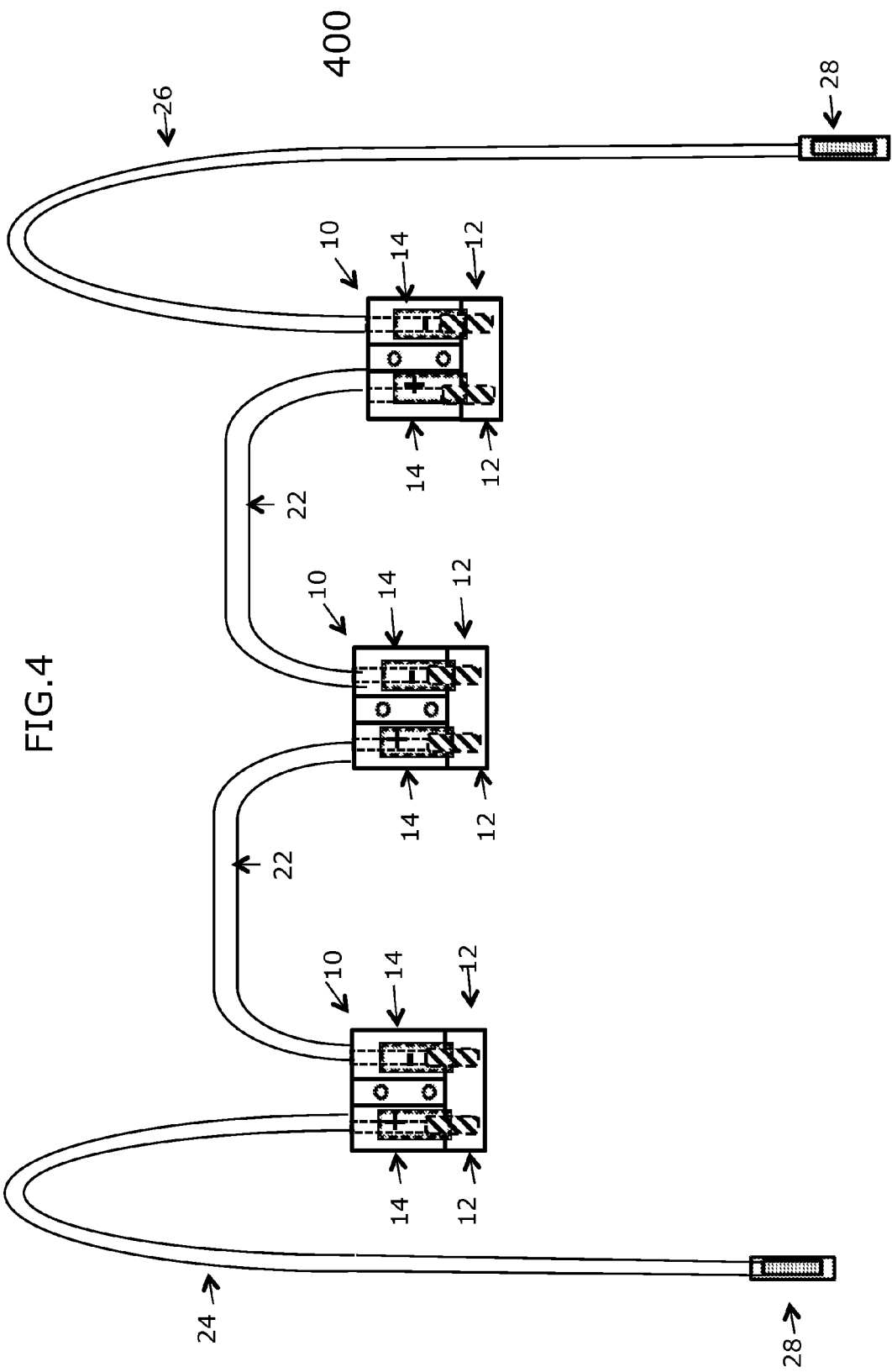
FIG. 4 illustrates a top down view of a series wire bridge system according to one embodiment of the present disclosure.
Figure 5:
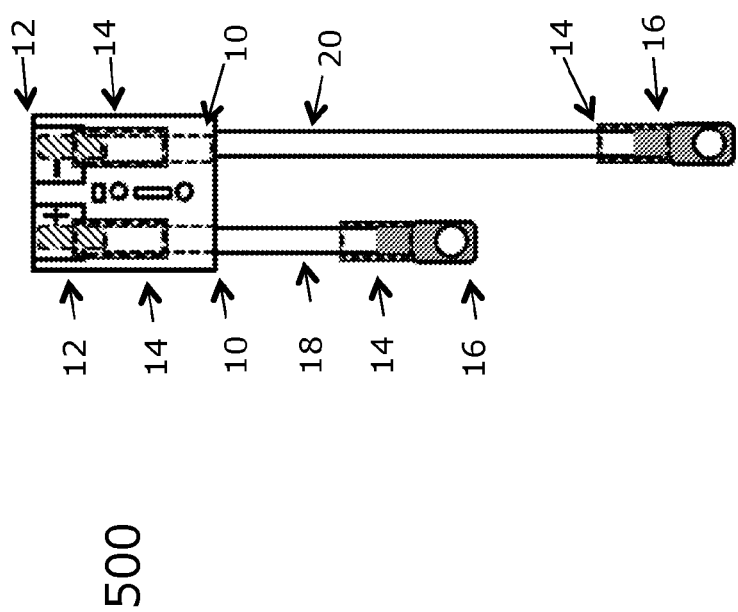
FIG. 5 illustrates a top down view of mated battery side connectors according to one embodiment of the present disclosure.

In general, the complete multi-battery connection system can connect two or more batteries in series to increase the available voltage. In one embodiment, as illustrated in FIGS. 1 and 2, the disclosed multi-battery series connection system 100, 200 generally includes a series wire bridge system 300, 400, as illustrated in FIGS. 3 and 4, and at least two mated battery side connectors 500, as illustrated in FIG. 5.

More specifically, in one embodiment, the series wire bridge system 300, 400 includes at least two connection blocks 10, a series bridging wire 22 with a terminal connector 12 covered with shrink wire wrap 14 on each end of the series bridging wire 22, the series bridging wire 22 connecting the first connection block 10 and the second connection block 10 via the two terminal connectors 12, a positive, or red, wire lead 24 attached on one end to a connector 28, such as, but not limited to, a butt splice, ring terminal, ferrule, or other electrical connector, and on the other end, via a terminal connector 12 covered with shrink wire wrap 14, to the first connection block 10, and a negative, or black, wire lead 26 attached on one end to a connector 28, such as, but not limited to, a butt splice, ring terminal, ferrule, or other electrical connector, and on the other end, via a terminal connector 12 covered with shrink wire wrap 14, to the second connection block 10.

In some embodiments, the terminal connectors 12 are not covered with shrink wire wrap 14. Further, the positive wire lead 24 and the negative wire lead 26 can be wire leads of other colors. More specifically, the wire leads 24 and 26 will have identifiable colors that indicate which color wire lead is the positive side wire lead that connects to the positive side and which color wire lead is the negative side wire lead that connects to the negative side, as required by local electrical codes. For example, instead of red and black, the positive wire lead 24 can be brown and the negative wire lead 26 can be grey, as required in the United Kingdom.

In one embodiment, a mated battery side connector 500 includes a connection block 10, a positive, or red, wire 18 attached on one end to a terminal lug connector 16 covered with shrink wire wrap 14 and on the other end, via a terminal connector 12 covered with shrink wire wrap 14, to the connection block 10, and a negative, or black, wire 20 attached on one end to a terminal lug connector 16 covered with shrink wire wrap 14 and on the other end, via a terminal connector 12 covered with shrink wire wrap 14, to the connection block 10. In some embodiments, the terminal lug connectors 16 and/or the terminal connectors 12 are not covered with shrink wire wrap 14. Once again, the positive wire 18 and the negative wire 20 do not have to be red and black, but can have colors that correspond to local electric codes such as brown and grey.

FIGS. 6 through 8 illustrate how the system enables a user to efficiently, and safely, connect and disconnect multiple batteries 32. FIG. 6 illustrates a side view of a connection block 10 for a series wire bridge system 300, 400 and a side view of a connection block 10 for a mated battery side connector 500, and shows how the two connection blocks 10 connect to each other. More specifically, the terminal connectors 12 are designed to stack on top of each other when the connection block 10 for the series wire bridge system 300, 400 connects to the connection block 10 for the mated battery side connector 500. FIG. 7 illustrates a front view of the top and bottom terminal connectors 12 on a connection block 10, wherein the top terminal connector 12 is part of the series wire bridge system 300, 400 and the bottom terminal connector is part of the mated battery side connector 500. FIG. 8 illustrates a front view of the top and bottom terminal connector slots 30 on a connection block 10, wherein the top terminal connector slot 30 is located below the terminal connector 12 in the series wire bridge system 300, 400 and the bottom terminal connector slot 30 is located above the terminal connector 12 in the mated battery side connector 500.

In one embodiment of the series wire bridge system 300, 400, the positive wire lead 24 and the negative wire lead 26 are of equal length. In another embodiment, the positive wire lead 24 and the negative wire lead 26 are different lengths. However, regardless of the wire lengths relative to each other, both the positive wire lead 24 and the negative wire lead 26 can be any varying length as needed in application. As described above, the positive wire lead 24 and the negative wire lead 26 can each be connected to separate connection blocks 10. Each wire lead can connect on one end to a connection block 10 via a terminal connector 12, wherein the terminal connector 12 is attached to the end of the wire lead. In some embodiments, the terminal connector 12 is attached to the end of the wire lead using shrink wire wrap 14. The ends of the positive wire lead 24 and the negative wire lead 26 that are not connected to a connection block 10 can be connected, via a connector 28, to a load, such as a motor's cable or a charging station that charges the batteries. Further, the positive wire lead 24 can connect to the positive terminal of the first connection block 10 and the negative wire lead 26 can connect to the negative terminal of the last connection block 10, as illustrated in FIGS. 3 and 4.

In one embodiment, as illustrated in FIG. 3, the middle portion of the series wire bridge system 300 includes two connection blocks 10, a series bridging wire 22, such as a black bridging wire, and two terminal connectors 12 that are crimped to the ends of the series bridging wire 22 and covered, or, in some embodiments, not covered, with shrink wire wrap 14. When the terminal connectors 12 are crimped to the ends of the series bridging wire 22, as illustrated in FIG. 13, the series bridging wire 22 becomes sealed to the terminal connectors 12. The sealed combination of the series bridging wire 22 and terminal connector 12 can then be inserted and locked into a terminal connector slot 30 on the negative terminal of the first connection block 10 and a terminal connector slot 30 on the positive terminal of the second connection block 10. In a two-battery system, there is one series bridging wire 22 connecting two connection blocks 10. In a three-battery system, there are two series bridging wires 22 connecting three connection blocks 10, as illustrated in FIG. 4, wherein the first series bridging wire 22 connects on its first end to the negative terminal of the first connection block 10 and on its second end to the positive terminal of the second connection block 10, and the second series bridging wire 22 connects on its first end to the negative terminal of the second connection block 10 and on its second end to the positive terminal of the third connection block 10.

In one embodiment of the series wire bridge system 300, the positive wire lead 24 is crimped on one end and secured to the terminal connector 12 using shrink wire wrap 14 and, on the other end, is crimped and secured to a connector 28, such as, but not limited to, a butt splice, ring terminal, ferrule, or other electrical connector, using, for example, shrink wire wrap 14, as illustrated in FIG. 9. The combination of the positive wire lead 24 and terminal connector 12 can then be pushed into the terminal connector slot 30 on the positive terminal of the first connection block 10. The negative wire lead 26, similar to the positive wire lead 24, is crimped on one end and secured to the terminal connector 12 using, for example, shrink wire wrap 14 and, on the other end, is crimped and secured to a connector 28, such as, but not limited to, a butt splice, ring terminal, ferrule, or other electrical connector, using, for example, shrink wire wrap 14, as illustrated in FIG. 10. The combination of the negative wire lead 26 and terminal connector 12 is then pushed into the terminal connector slot 30 on the negative terminal of the second connection block 10. As illustrated in FIG. 4, the series wire bridge system 400 can, in one embodiment, connect more than two batteries 32 using two or more series bridging wires 22, but may only have one positive wire lead 24 and one negative wire lead 26. In some embodiments, shrink wire wrap 14 is not used for one or more of the above-described connections.

In one embodiment of the mated battery side connector 500, the positive wire 18 and negative wire 20 are of different lengths, with the positive wire 18 being shorter than the negative wire 20, as illustrated in FIGS. 11 and 12. In one embodiment, the positive wire 18 can be 5 inches long and the negative wire 20 can be 10 inches long. However, regardless of the wire lengths relative to each other, both the positive wire 18 and the negative wire 20 can be any varying length as needed in application. One end of each of the wires can be connected to a connection block 10 through the use of terminal connectors 12. The other end of the positive wire 18 and negative wire 20 can be connected to a battery 32, such as a 12-volt battery, through the use of a terminal lug connector 16, as illustrated in FIGS. 14 and 15. The positive wire 18 can connect to the positive terminal of the battery 32 and the negative wire 20 can connect to the negative terminal of the battery 32.

More specifically, each of the mated battery side connectors 500 includes a connection block 10 with a positive wire 18 and a negative wire 20 that are crimped on their first ends and secured to terminal connectors 12 using, for example, shrink wire wrap 14. FIG. 8 illustrates a terminal connector slot 30 in a connection block 10. The combination of the positive wire 18 and terminal connector 12 can be pushed into the terminal connector slot 30 on the positive terminal of the connection block 10. The combination of the negative wire 20 and terminal connector 12 can then be pushed into the terminal connector slot 30 on the positive terminal of the connection block 10. The second ends of the positive wire 18 and negative wire 20 are crimped and each wire can be secured to a terminal lug connector 16 using, for example, shrink wire wrap 14. In some embodiments, shrink wire wrap 14 is not used for one or more of the above-described connections.

In one embodiment, the multi-battery connection system 100 easily connects two or more batteries 32 in series. More specifically, the mated battery side connector 500 can be left affixed to a battery 32 with its connection block 10 disconnected from another connection block 10. The series wire bridge system 300, 400 can also be left intact and affixed to a load, such as, but not limited to, a motor's cables or a charging station, with its connection block 10 disconnected from another connection block 10. Therefore, when a user desires to create a plurality of supply circuits, the user simply has to connect the two connection blocks 10 to each other. While 24- and 36-volt systems are described herein, it is appreciated that additional series bridging wires 22 can be added to a base 24-volt system to create any voltage system in 12-volt increments (ex: 36-volt, 48-volt, 60-volt, 72-volt, etc.). Additionally, smaller or larger voltage batteries can be connected in series using the described system. Given the electrical nature of the multi-battery series connection system 100, 200, in some embodiments, the system 100, 200 can be a sealed and/or waterproof system.

Figure 16:
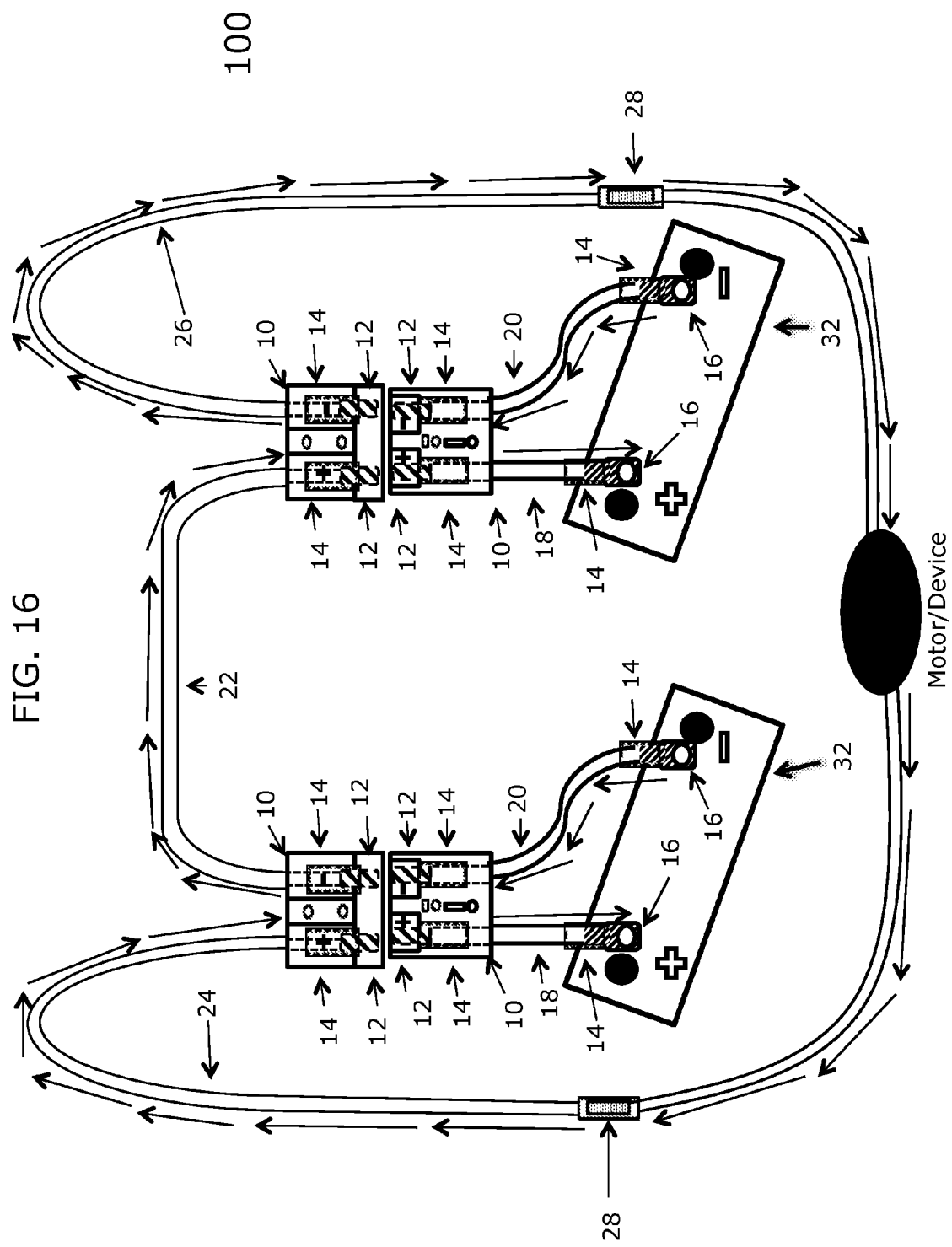
FIG. 16 illustrates the flow of the electrical current through the disclosed multi-battery series connection system when two batteries and a motor are connected in series according to one embodiment of the present disclosure.
Figure 18:
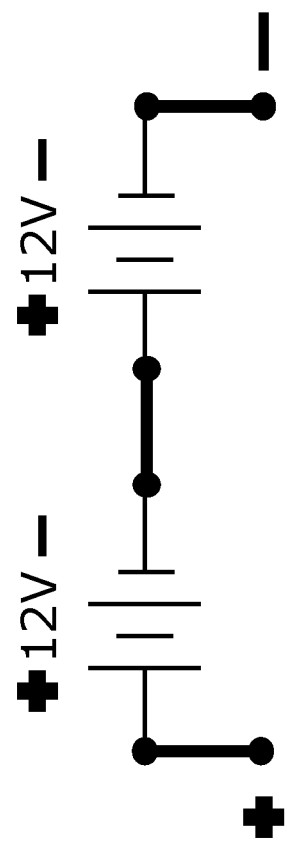
FIG. 18 illustrates the flow of the electrical current through the disclosed multi-battery series connection system according to one embodiment of the present disclosure.

Therefore, the full series connection system setup for two batteries 32 includes a first mated battery side connector 500 with a first connection block 10 and connected to a first battery 32 through the use of two terminal lug connectors 16; the second mated battery side connector 500 with a second connection block 10 and connected to the second battery 32 through the use of two terminal lug connectors 16; the positive wire lead 24 connected to a load, such as a motor's cable or a charging station, and a third connection block 10; the negative wire lead 26 connected to a load, such as a motor's cable or a charging station, and a fourth connection block 10; the series bridging wire 22 connecting the third and fourth connection blocks 10; and the third and fourth connection blocks 10 of the series wire bridge system 300 pairing with, and connected to, the first and second connection blocks 10 of the mated battery side connectors 500. Once these connections are made, the user has a 24-volt battery system. FIGS. 16 and 18 illustrate the flow of the electrical current through a two-battery system. To disconnect the series wire bridge system 300 from the batteries 32, a user can unplug the connection blocks 10 from each other.

Figure 17:
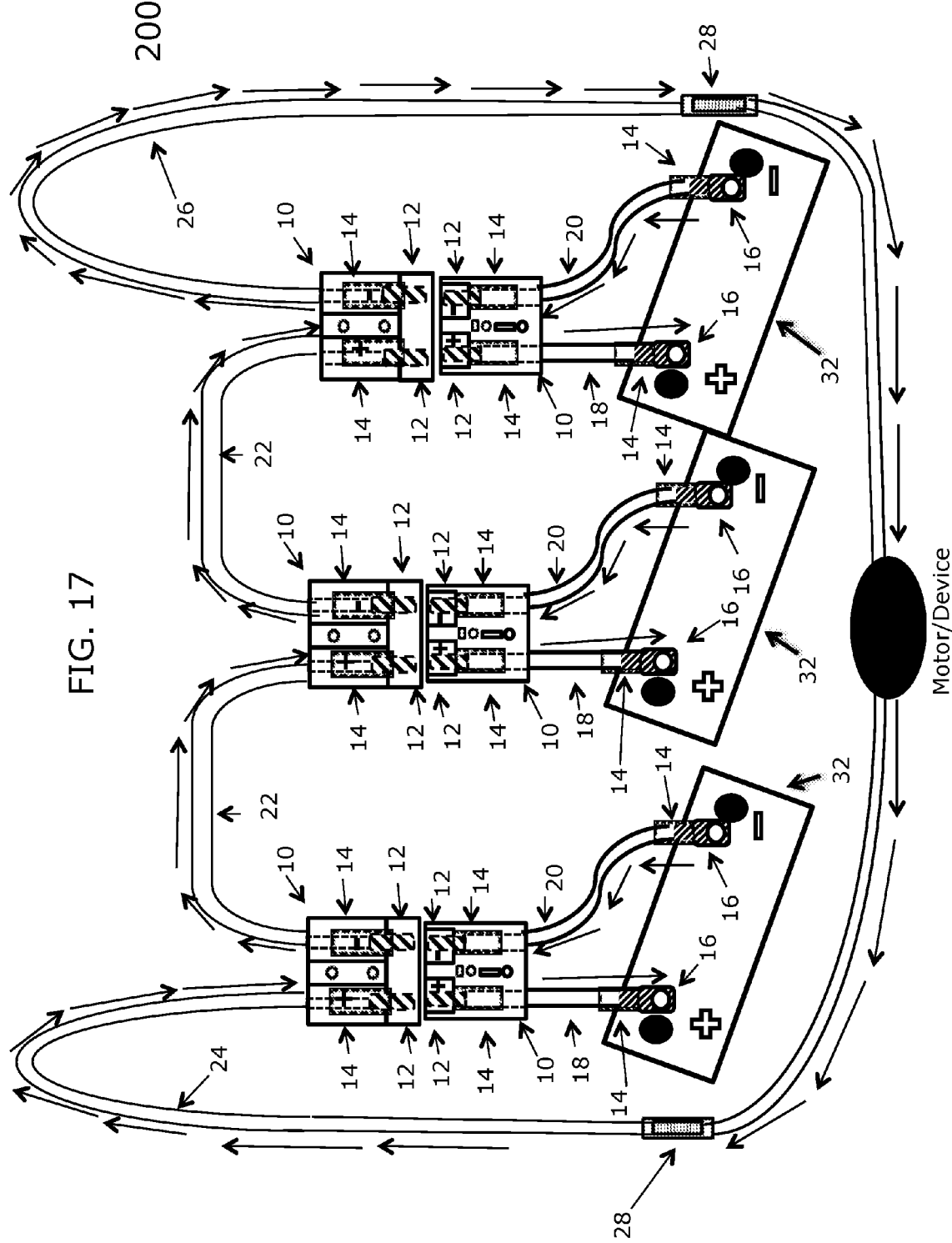
FIG. 17 illustrates the flow of the electrical current through the disclosed multi-battery series connection system when three batteries and a motor are connected in series according to one embodiment of the present disclosure.
Figure 19:
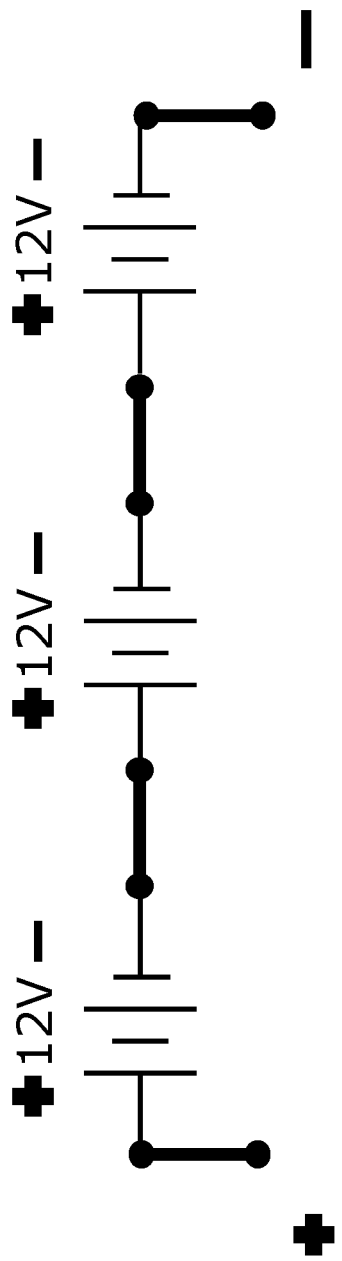
FIG. 19 illustrates the flow of the electrical current through the disclosed multi-battery series connection system according to one embodiment of the present disclosure.
Figure 20:
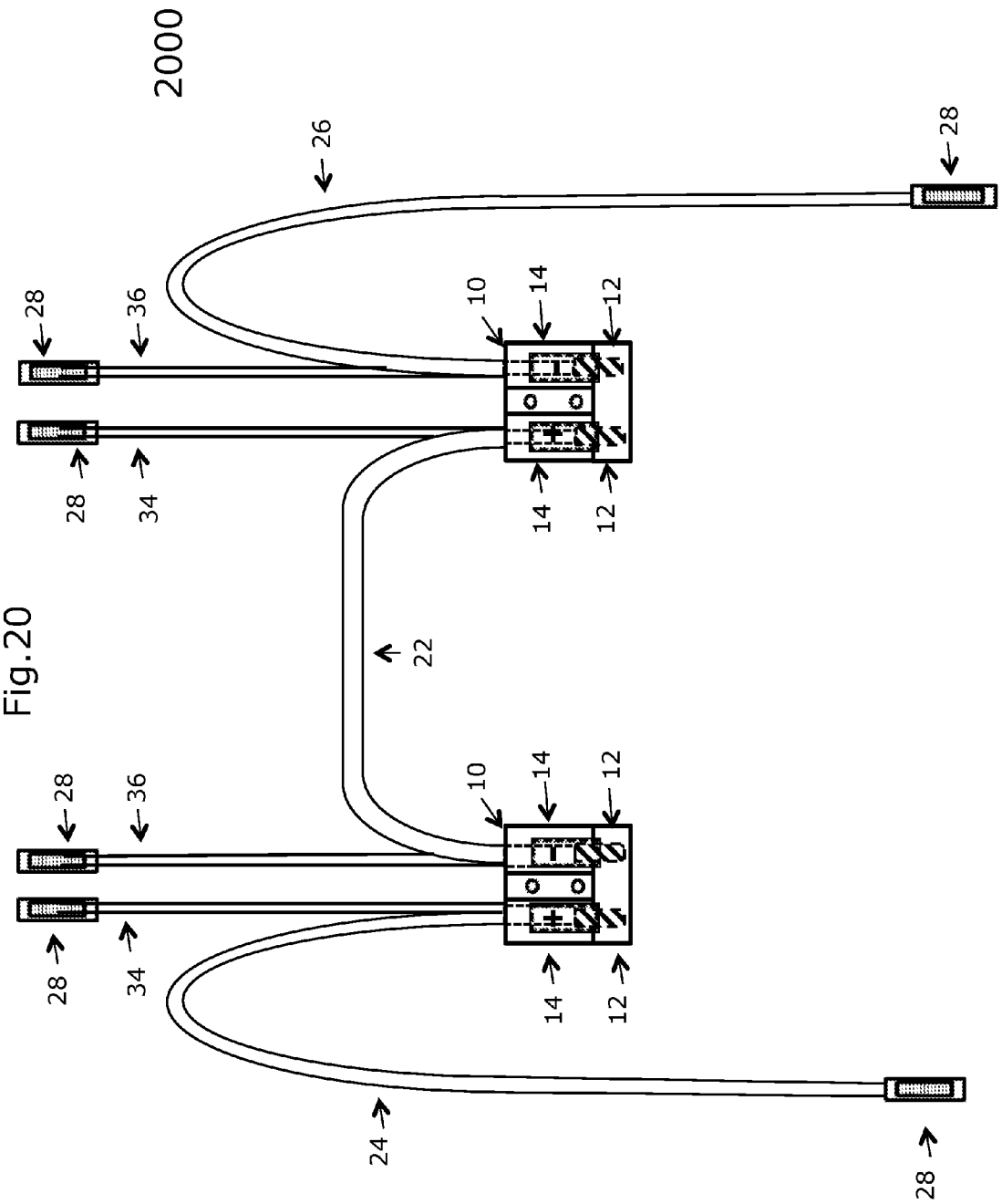
FIG. 20 illustrates a top down view of the disclosed multi-battery series connection system with independent parallel battery leads according to one embodiment of the present disclosure.
Figure 21:
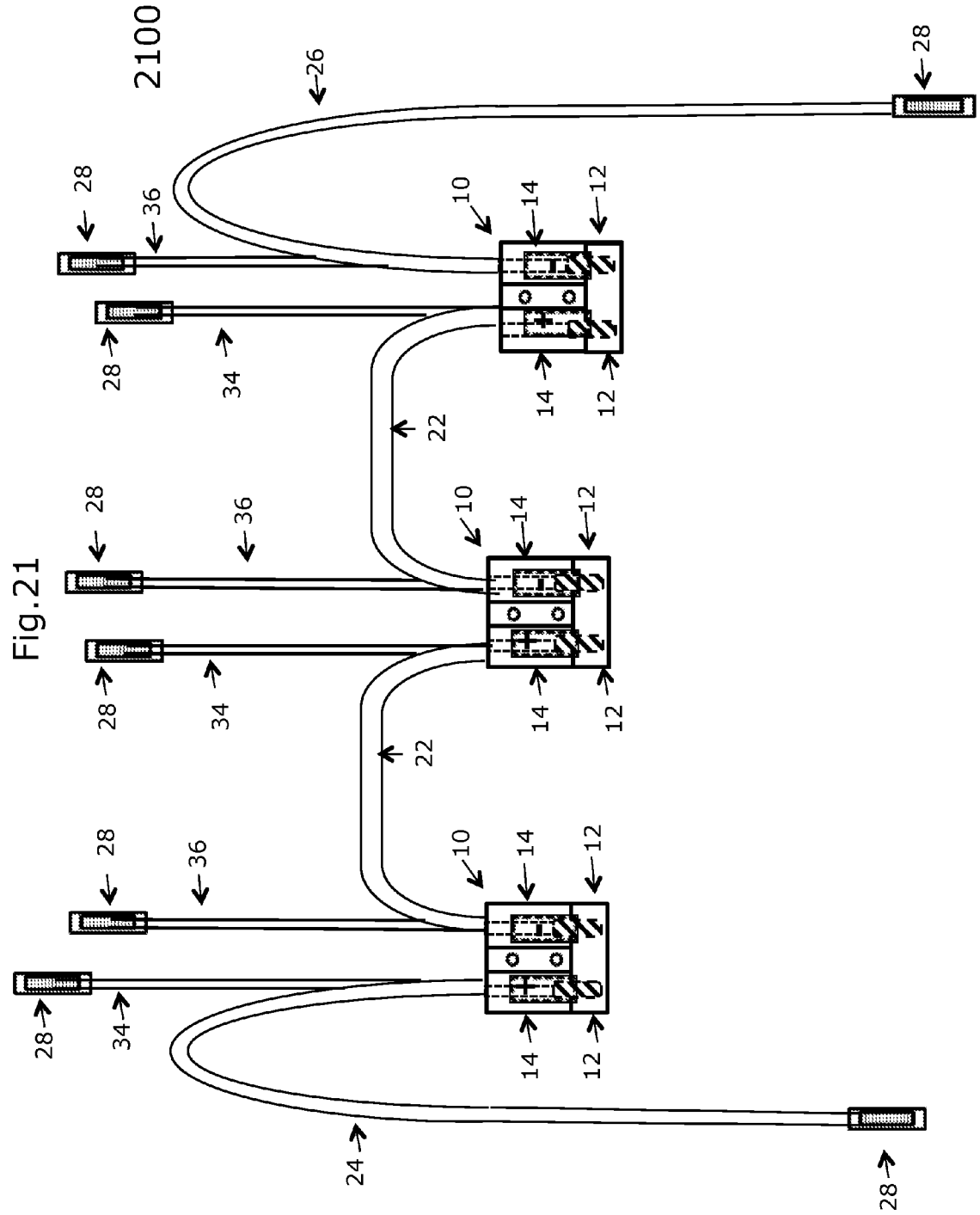
FIG. 21 illustrates a top down view of the disclosed multi-battery series connection system with independent parallel battery leads according to one embodiment of the present disclosure.

The full series connection system setup for three batteries 32 includes a first mated battery side connector 500 with a first connection block 10 and connected to a first battery 32 through the use of two terminal lug connectors 16, the second mated battery side connector 500 with a second connection block 10 and connected to the second battery 32 through the use of the terminal lug connectors 16, the third mated battery side connector 500 with a third connection block 10 and connected to the third battery 32 through the use of the terminal lug connectors 16, the positive wire lead 24 connected to a load, such as a motor's cable or a charging station, and a fourth connection block 10, the first series bridging wire 22 connecting the fourth connection block 10 and a fifth connection block 10, the negative wire lead 26 connected to a load, such as a motor's cable or a charging station, and a sixth connection block 10, the second series bridging wire 22 connecting the fifth connection block 10 and the sixth connection block 10, and the fourth, fifth, and sixth connection blocks 10 of the series wire bridge system 400 pairing with and connecting to the first, second, and third connection blocks 10 of the mated battery side connectors 500. Once these connections are made, the user has a 36-volt battery system. FIGS. 17 and 19 illustrate the flow of the electrical current through a three-battery system. To disconnect the series wire bridge system 400 from the batteries 32, a user can unplug the connection blocks 10 from each other.

Figure 22:
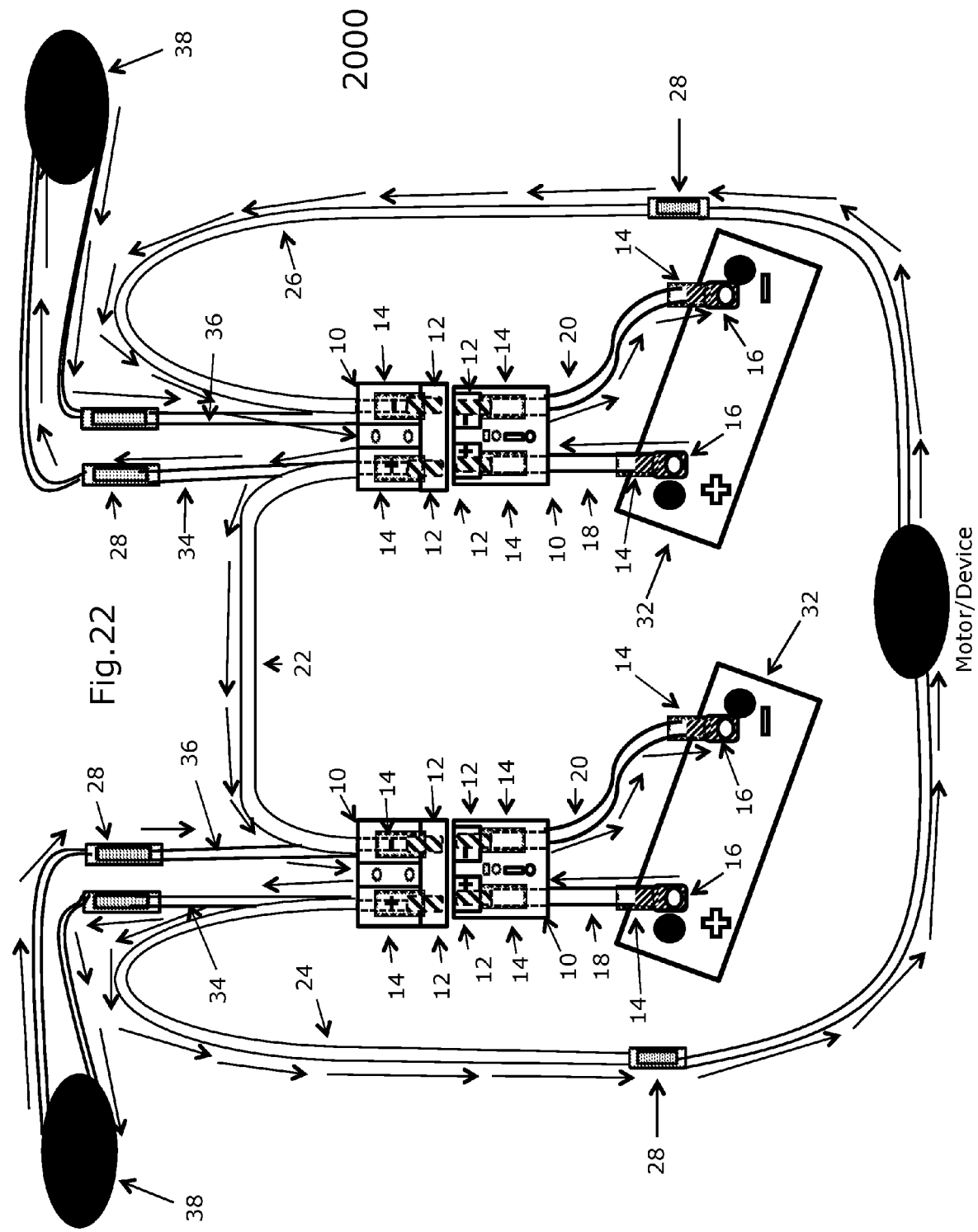
FIG. 22 illustrates the flow of electrical current through the disclosed multi-battery series connection system when two batteries and a motor are connected in series and two additional devices are connected to the system in parallel according to one embodiment of the present disclosure.
Figure 23:
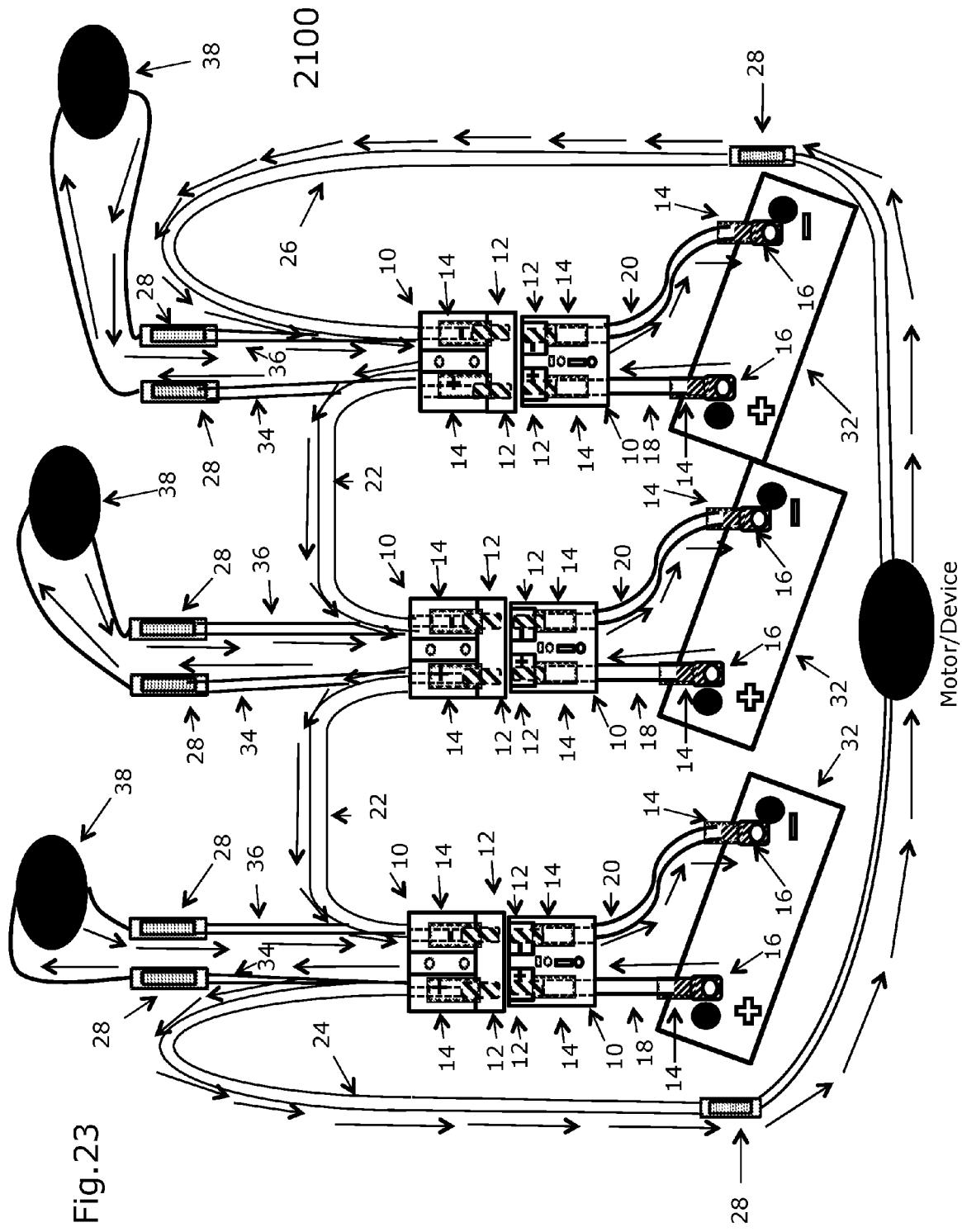
FIG. 23 illustrates the flow of electrical current through the disclosed multi-battery series connection system when three batteries and a motor are connected in series and three additional devices are connected to the system in parallel according to one embodiment of the present disclosure.

In one embodiment, as illustrated in FIGS. 20 through 23, the disclosed multi-battery series connection system 100, 200 can include a secondary connection system 2000, 2100 that directly attaches to two or more loads 38, such as, but not limited to, charging stations. Further, this embodiment can connect to at least two mated battery side connectors 500 that, in turn, each connect to a battery, as illustrated in FIGS. 22 and 23. More specifically, in one embodiment, the secondary connection system 2000, 2100 can include two connection blocks 10, a series bridging wire 22 connecting the two connection blocks 10 via a terminal connector 12 with shrink wire wrap 14 on each end of the series bridging wire 22, a first positive wire lead 24 attached to the first connection block 10 via a terminal connector 12 with shrink wire wrap 14, a first negative wire lead 26 attached to the second connection block 10 via a terminal connector 12 with shrink wire wrap 14, a second positive wire lead 34 connected to and leading from each of the two connection blocks 10 via a terminal connector 12 with shrink wire wrap 14, a second negative wire lead 36 connected to and leading from each of the two connection blocks 10 via a terminal connector 12 with shrink wire wrap 14, and six connectors 28, one connected to end of each of the six wire leads. In one embodiment, one mated battery side connector 500 includes a connection block 10, a positive wire 18 attached on one end to the third connection block 10 via a first terminal connector 12 with shrink wire wrap 14 and on the other end to a terminal lug connector 16, and a negative wire 20 attached on one end to the fourth connection block 10 via a second terminal connector 12 with shrink wire wrap 14 and on the other end to a terminal lug connector 16. In some embodiments, shrink wire wrap 14 is not used for one or more of the above-described connections.

In one embodiment, the secondary connection system 2000, 2100 connects two or more batteries 32 in series and offers up to two parallel connections, one off of each battery 32, each connection to a load 38. To connect two batteries 32, as illustrated in FIG. 22, a user can first connect each of the two mated battery side connectors 500 to a battery 32 through the use of terminal lug connectors 16 attached to one end of a positive wire 18 and one end of a negative wire 20. Once these connections are made, a user can connect the positive wire lead 24 and the negative wire lead 26 from the secondary system 2000 to a load, such as a motor's cables or a charging station, using terminal lug connectors 16 that are attached to one end of the positive wire lead 24 and one end of the negative wire lead 26. Finally, a user can connect the connection blocks 10 from the secondary system 2000 to the connection blocks 10 from the mated battery side connector 500 to create a 24-volt battery system.

To connect three batteries 32, as illustrated in FIG. 23, a user can first connect each of the three mated battery side connectors 500 to a battery 32 through the use of terminal lug connectors 16 that are attached to one end of a positive wire 18 and one end of a negative wire 20. Once these connections are made, a user can connect the positive wire lead 24 and the negative wire lead 26 from the secondary system 2100 to a load, such as a motor's cables or a charging station, using terminal lug connectors 16 attached to one end of the positive wire lead 24 and one end of the negative wire lead 26. Finally, a user can connect the connection blocks 10 from the secondary system 2100 to the connection blocks 10 from the mated battery side connector 500 to create a 36-volt battery system.

In some embodiments of the secondary connection system 2000, 2100, a user can also connect a load 38, such as a motor or charging station, to the secondary connection system 2000, 2100 in parallel. To make this connection, the user can first connect the second positive wire lead 34 that is attached to a connection block 10 to a first cable on the load 38. The user can next connect the second negative wire lead 36 that is attached to the connection block 10 to a second cable on the load 38. The user then has a parallel connection between the secondary connection system 2000, 2100 and the load 38. Similar to the multi-battery connection system 100, 200, in some embodiments, the secondary connection system 2000, 2100 can be a sealed and/or waterproof system.

Multi-Battery Connection System: Parallel

Figure 33:
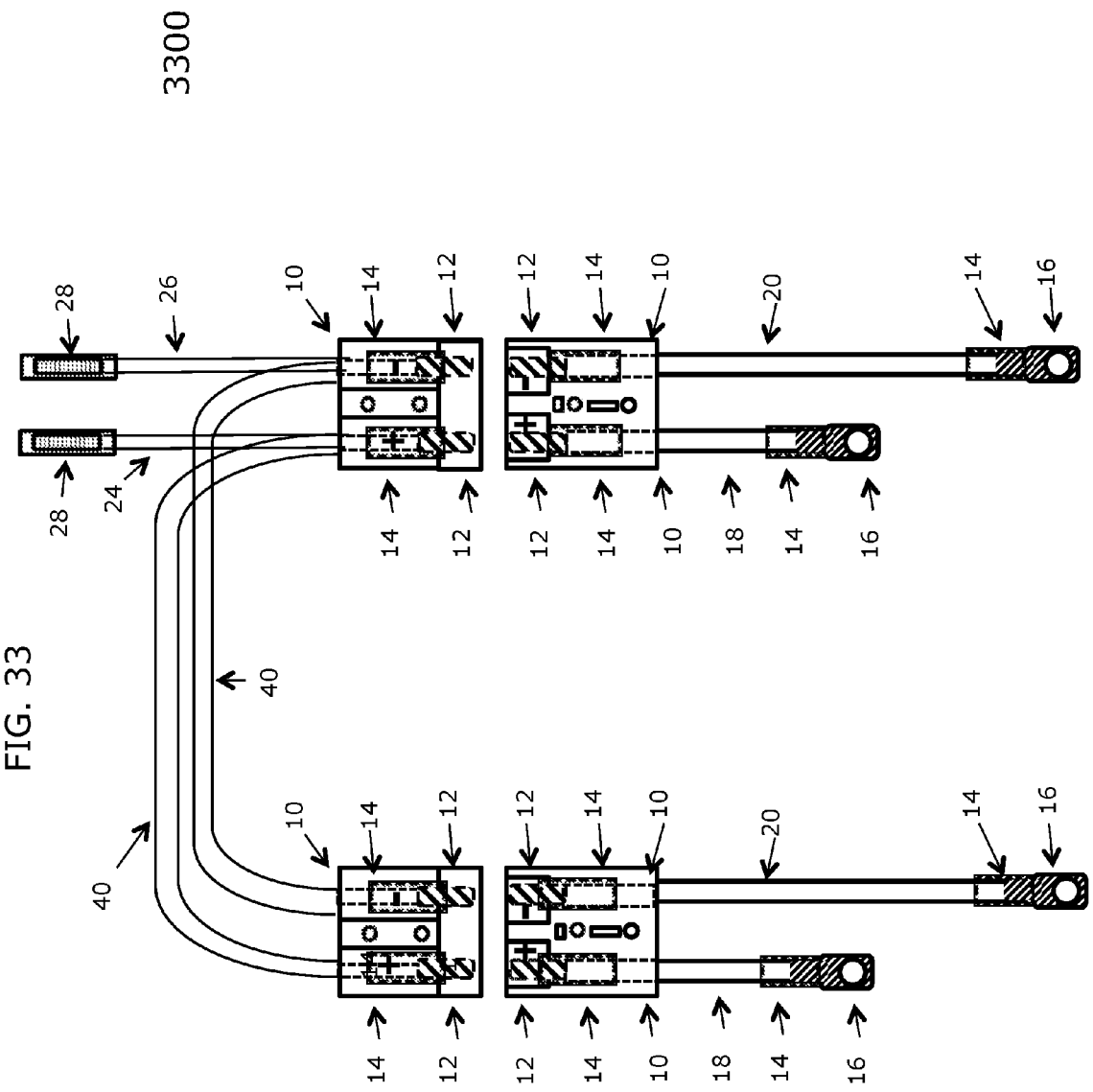
FIG. 33 illustrates a top down view of the disclosed multi-battery parallel connection system according to one embodiment of the present disclosure.
Figure 34:
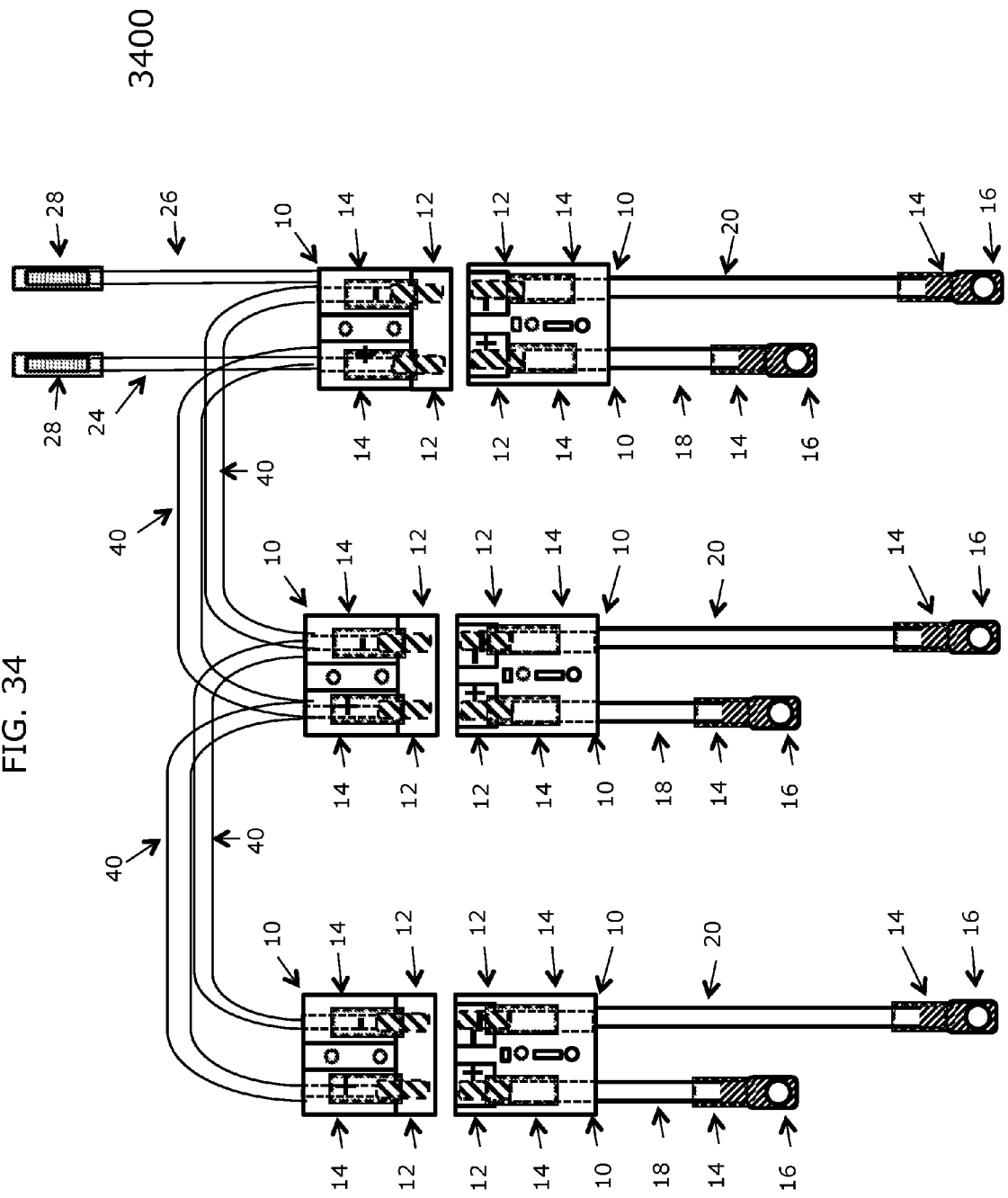
FIG. 34 illustrates a top down view of the disclosed multi-battery parallel connection system according to one embodiment of the present disclosure.
Figure 35:
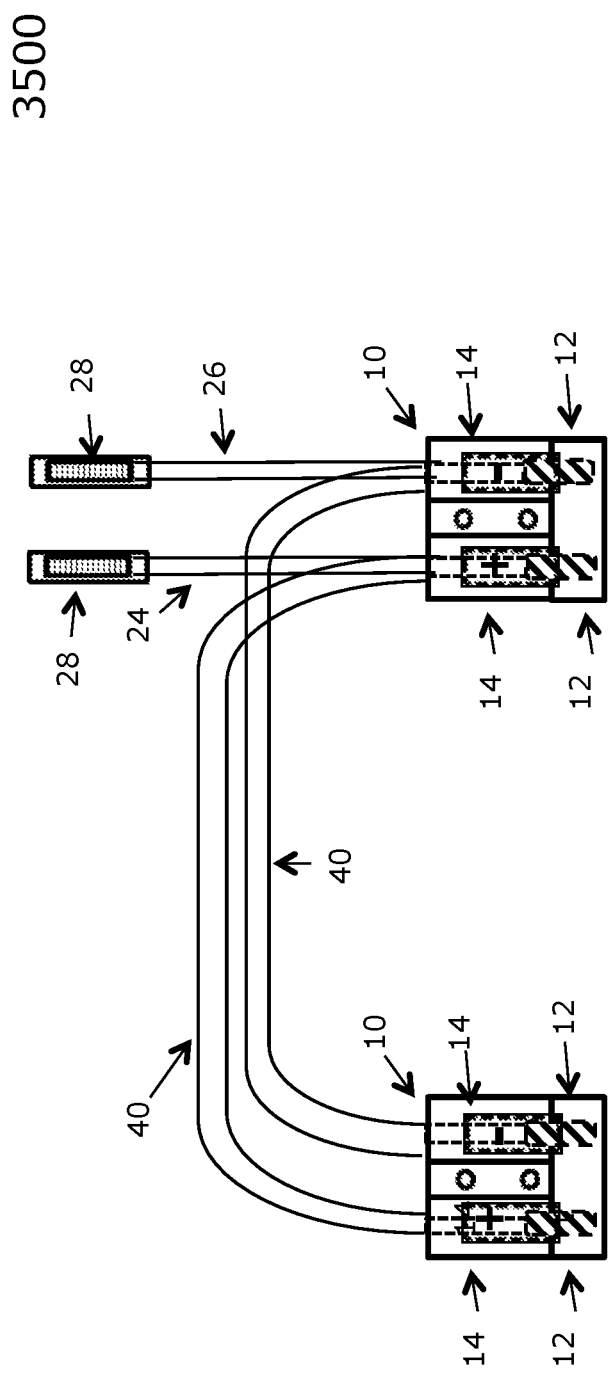
FIG. 35 illustrates a top down view of a parallel wire bridge system according to one embodiment of the present disclosure.
Figure 36:
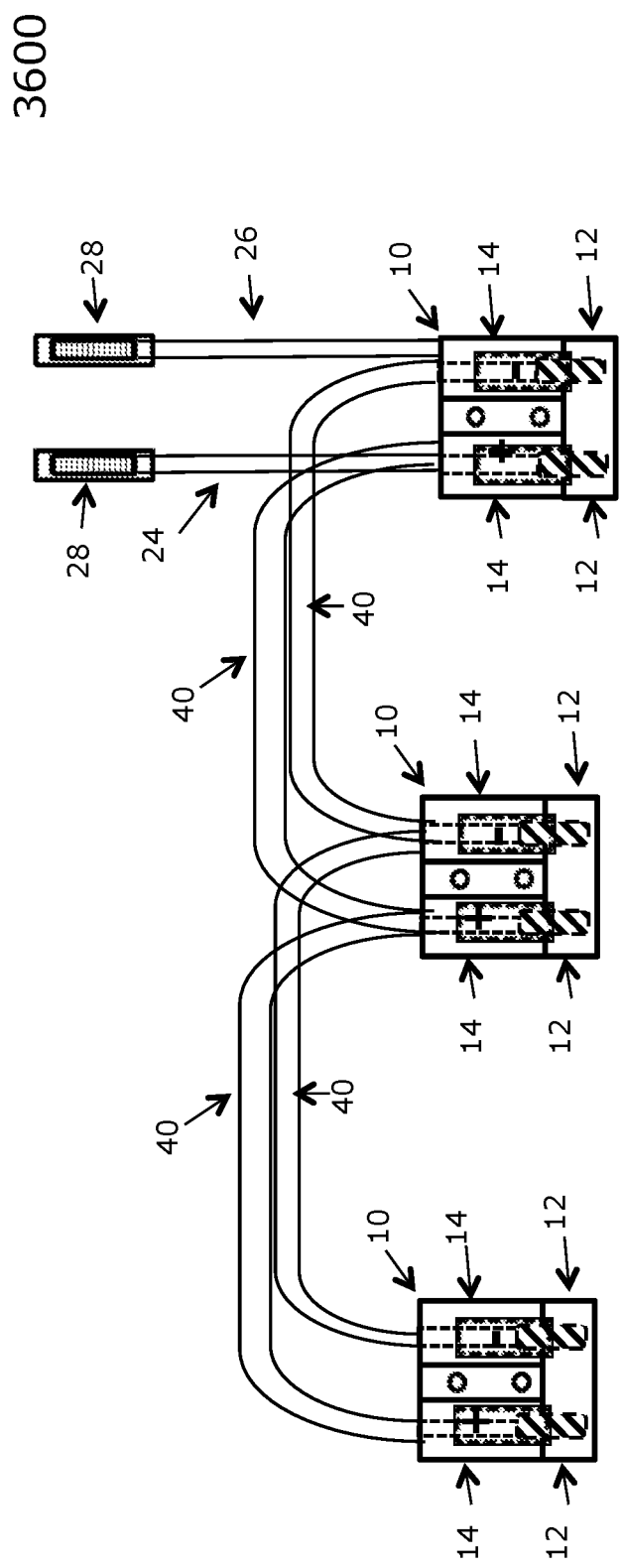
FIG. 36 illustrates a top down view of a parallel wire bridge system according to one embodiment of the present disclosure.
Figure 37:
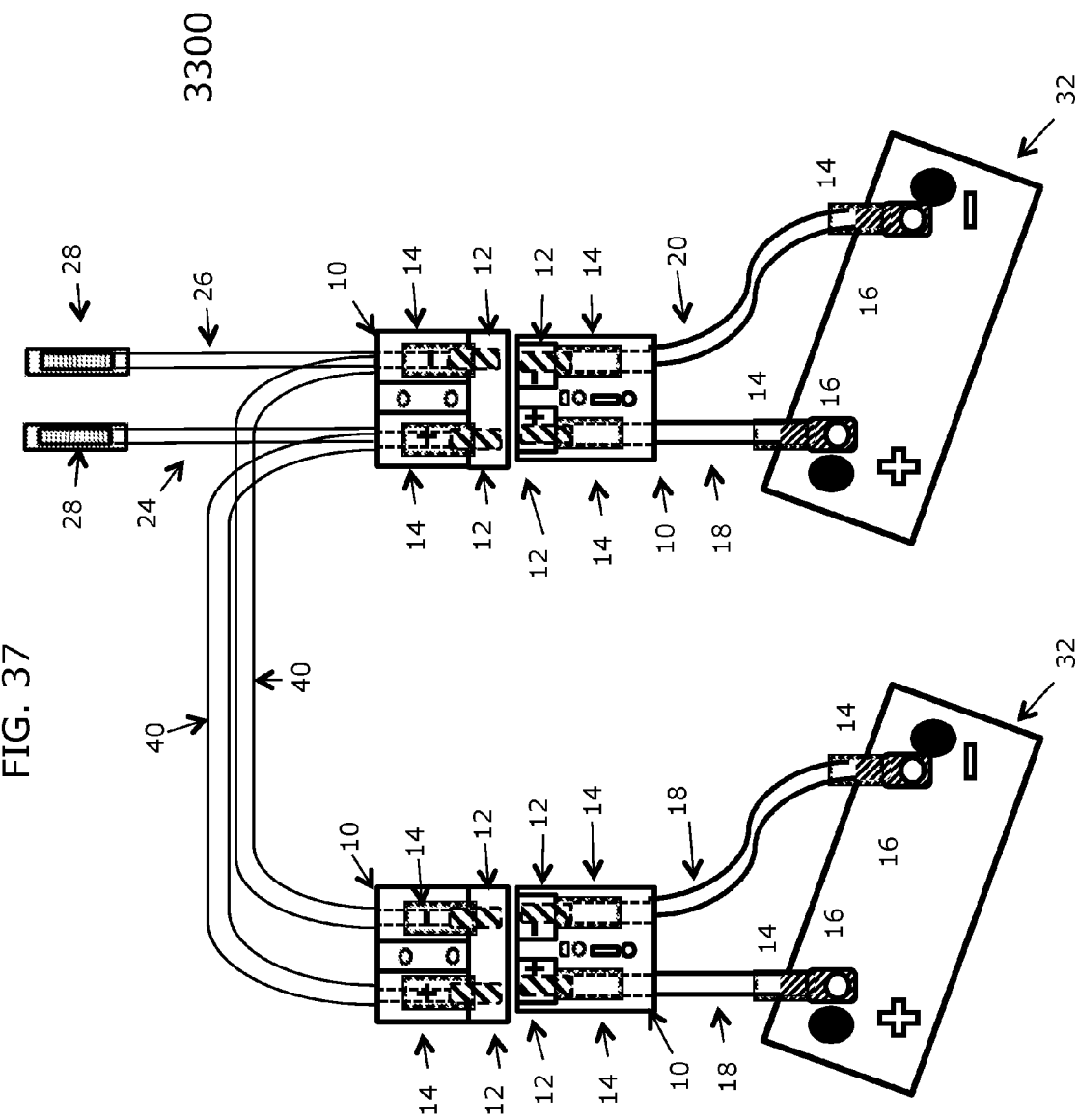
FIG. 37 illustrates a top down view of the disclosed multi-battery parallel connection system connected to two batteries and having independent parallel battery leads according to one embodiment of the present disclosure.
Figure 38:
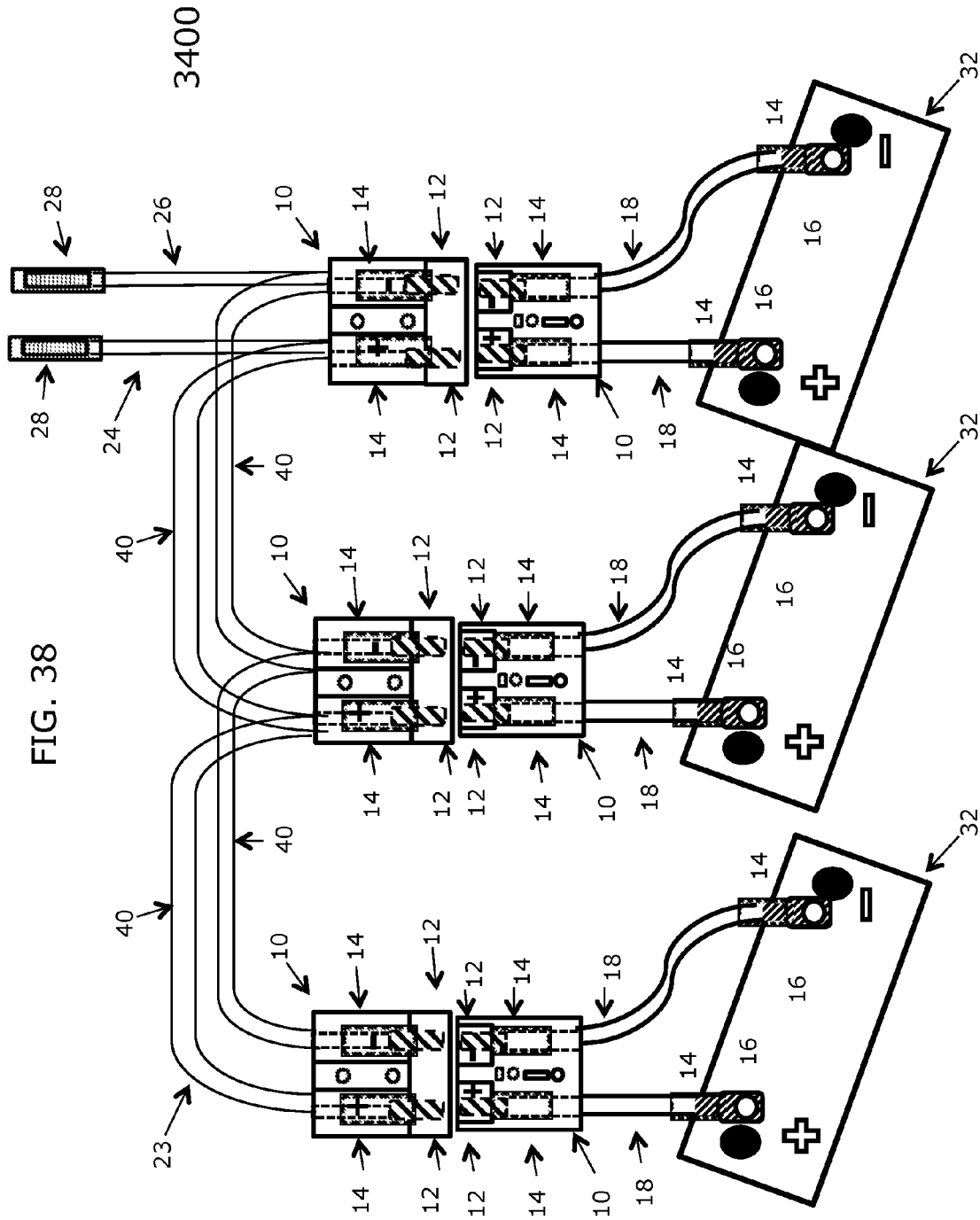
FIG. 38 illustrates a top down view of the disclosed multi-battery parallel connection system connected to three batteries and having independent parallel battery leads according to one embodiment of the present disclosure.

In general, the complete multi-battery connection system can, in some embodiments, connect two or more batteries in parallel to increase the available capacity (amp hours). In one embodiment, as illustrated in FIGS. 33 and 34, the disclosed multi-battery parallel connection system 3300, 3400 generally includes a parallel wire bridge system 3500, 3600, as illustrated in FIGS. 35 and 36, and at least two mated battery side connectors 500, as illustrated in FIG. 5. Several features in the parallel connection system are the same as features in the series connection system. The main variation in the two multi-battery connection systems involves the different bridge systems and the placement of wire leads, as described in more detail below.

More specifically, in one embodiment, the parallel wire bridge system 3500, 3600 includes at least two connection blocks 10; two parallel bridging wires 40, wherein a first parallel bridging wire 40 with a terminal connector 12 covered with shrink wire wrap 14 and on each end of the parallel bridging wire 40 connects the first connection block 10 to the second connection block 10 via the positive terminal of two terminal connectors 12, and wherein a second parallel bridging wire 40, in a similar manner to the first parallel bridging wire 40, connects the first connection block 10 to the second connection block 10 via the negative terminal of two terminal connectors 12; a positive, or red, wire lead 24 attached on one end to a connector 28, such as, but not limited to, a butt splice, ring terminal, ferrule, or other electrical connector, and on the other end, via a terminal connector 12 covered with shrink wire wrap 14, to the positive terminal of the first connection block 10; and a negative, or black, wire lead 26 attached on one end to a connector 28, such as, but not limited to, a butt splice, ring terminal, ferrule, or other electrical connector, and on the other end, via a terminal connector 12 covered with shrink wire wrap 14, to the negative terminal of the first connection block 10.

In some embodiments, the terminal connectors 12 are not covered with shrink wire wrap 14. Further, the positive wire lead 24 and the negative wire lead 26 can be wire leads of other colors. More specifically, the wire leads 24 and 26 will have identifiable colors that indicate which color wire lead is the positive side wire lead that connects to the positive side and which color wire lead is the negative side wire lead that connects to the negative side, as required by local electrical codes. For example, instead of red and black, the positive wire lead 24 can be brown and the negative wire lead 26 can be grey, as required in the United Kingdom.

The parallel system, similar to the series system, uses a mated battery side connector 500 for each connection block 10, as illustrated in FIG. 5 and described above. Therefore, the mated battery side connector 500, the corresponding connection process to multiple batteries through the connection blocks 10, as illustrated in FIGS. 6-8 and 11-12 and described for the series system, and the general connection system for the wire leads 24 and 26, as illustrated in FIGS. 9 and 10 and described for the series system, is similar for the parallel system.

In one embodiment, as illustrated in FIG. 35, the middle portion of the parallel wire bridge system 3500 includes two connection blocks 10, a first and a second parallel bridging wire 40, such as black bridging wires, and terminal connectors 12 crimped to the ends of each of the first and second parallel bridging wires 40 and covered, or, in some embodiments, not covered, with shrink wire wrap 14. When the terminal connectors 12 are crimped to the ends of the parallel bridging wire 40, similar to the series bridging wire 22 illustrated in FIG. 13, the parallel bridging wire 40 becomes sealed to the terminal connectors 12. The sealed combination of the first parallel bridging wire 40 and terminal connector 12 can then be inserted and locked into a terminal connector slot 30 on the positive terminal of the first connection block 10 and a terminal connector slot 30 on the positive terminal of the second connection block 10, and the sealed combination of the second parallel bridging wire 40 and terminal connector 12 can then be inserted and locked into a terminal connector slot 30 on the negative terminal of the first connection block 10 and a terminal connector slot 30 on the negative terminal of the second connection block 10.

In a two-battery system, there are two parallel bridging wires 40 connecting two connection blocks 10. In a three-battery system, there are four parallel bridging wires 40 connecting three connection blocks 10 to make the parallel wire bridge system 3600, as illustrated in FIG. 36. For the parallel wire bridge system 3600, a third parallel bridging wire 40 connects on its first end to the positive terminal of the second connection block 10 and on its second end to the positive terminal of the third connection block 10, and a fourth parallel bridging wire 40 connects on its first end to the negative terminal of the second connection block 10 and on its second end to the negative terminal of the third connection block 10.

As mentioned above, in one embodiment of the parallel wire bridge system 3500, 3600, the positive wire lead 24 is crimped on one end and secured to the terminal connector 12 using shrink wire wrap 14 and, on the other end, is crimped and secured to a connector 28, such as, but not limited to, a butt splice, ring terminal, ferrule, or other electrical connector, using, for example, shrink wire wrap 14, as illustrated in FIG. 9. The combination of the positive wire lead 24 and terminal connector 12 can then be pushed into the terminal connector slot 30 on the positive terminal of the first connection block 10. The negative wire lead 26, similar to the positive wire lead 24, is crimped on one end and secured to the terminal connector 12 using, for example, shrink wire wrap 14 and, on the other end, is crimped and secured to a connector 28, such as, but not limited to, a butt splice, ring terminal, ferrule, or other electrical connector, using, for example, shrink wire wrap 14, as illustrated in FIG. 10. The combination of the negative wire lead 26 and terminal connector 12 is then pushed into the terminal connector slot 30 on the negative terminal of the first connection block 10. As illustrated in FIG. 36, the parallel wire bridge system 3600 can, in one embodiment, connect more than two batteries 32 using four or more parallel bridging wires 40, but may only have positive wire lead 24 and one negative wire lead 26. These wire leads 24, 26 can connect to an electronic device, such as an automatic charging relay, which can charge the batteries. Additionally, the positive wire lead 24 may be attached to a fuse block or an inline fuse holder.

In some embodiments, shrink wire wrap 14 is not used for one or more of the above-described connections. The positive wire lead 24 and the negative wire lead 26 can connect to a load, such as a motor or a charging station, using terminal lug connectors 16 that are attached to one end of the positive wire lead 24 and one end of the negative wire lead 26. More specifically, a user can connect a load, such as a motor or charging station, to the connection system 3300, 3400 in parallel. To make this connection, the user can first connect the positive wire lead 24 that is attached to the positive terminal of the first connection block 10 to a first cable on the load. The user can next connect the negative wire lead 26 that is attached to the negative terminal of the first connection block 10 to a second cable on the load. The user then has a parallel connection between the connection system 3300, 3400 and the load.

In one embodiment, the multi-battery parallel connection system 3300, 3400 easily connects two or more batteries 32 in parallel. More specifically, the mated battery side connector 500 can be left affixed to a battery 32 with its connection block 10 disconnected from another connection block 10. The wire bridge system 3500, 3600 can also be left intact with its connection blocks 10 disconnected from their paired connection blocks 10 on the two or more batteries 32. Therefore, when a user desires to create a plurality of supply circuits, the user simply has to connect the paired connection blocks 10 to each other. While two- and three-battery systems are described herein, it is appreciated that additional parallel bridging wires 40 can be added to a base two-battery system to create any larger capacity system. Additionally, smaller or larger voltage batteries can be connected in parallel using the described system. Given the electrical nature of the multi-battery parallel connection system 3300, 3400, in some embodiments, the system 3300, 3400 can be a sealed and/or waterproof system.

Therefore, the full connection system setup for two batteries 32 includes a first mated battery side connector 500 with a first connection block 10 and connected to a first battery 32 through the use of two terminal lug connectors 16; the second mated battery side connector 500 with a second connection block 10 and connected to the second battery 32 through the use of two terminal lug connectors 16; the positive wire lead 24 connected to a load, such as a motor's cable or a charging station, and the positive terminal of a third connection block 10; the negative wire lead 26 connected to a load, such as a motor's cable or a charging station, and the negative terminal of the third connection block 10; first and second parallel bridging wires 40 connecting the third and fourth connection blocks 10; and the third and fourth connection blocks 10 of the parallel wire bridge system 3500 pairing with, and connected to, the first and second connection blocks 10 of the mated battery side connectors 500. Once these connections are made, the user has a two-battery parallel system. To disconnect the parallel wire bridge system 3500 from the batteries 32, a user can unplug the connection blocks 10 from each other.

The full connection system setup for three batteries 32 includes a first mated battery side connector 500 with a first connection block 10 and connected to a first battery 32 through the use of two terminal lug connectors 16, the second mated battery side connector 500 with a second connection block 10 and connected to the second battery 32 through the use of the terminal lug connectors 16, the third mated battery side connector 500 with a third connection block 10 and connected to the third battery 32 through the use of the terminal lug connectors 16, the positive wire lead 24 connected to a load, such as a motor's cable or a charging station, and the positive terminal of a fourth connection block 10, the negative wire lead 26 connected to a load, such as a motor's cable or a charging station, and the negative terminal of the fourth connection block 10, the first and second parallel bridging wires 40 connecting the fourth connection block 10 and a fifth connection block 10, the third and fourth bridging wires 40 connecting the fifth connection block 10 and the sixth connection block 10, and the fourth, fifth, and sixth connection blocks 10 of the parallel wire bridge system 3600 pairing with and connecting to the first, second, and third connection blocks 10 of the mated battery side connectors 500. Once these connections are made, the user has a three-battery system. To disconnect the parallel wire bridge system 3600 from the batteries 32, a user can unplug the connection blocks 10 from each other.

Multi-Device Connection System

Figure 24:
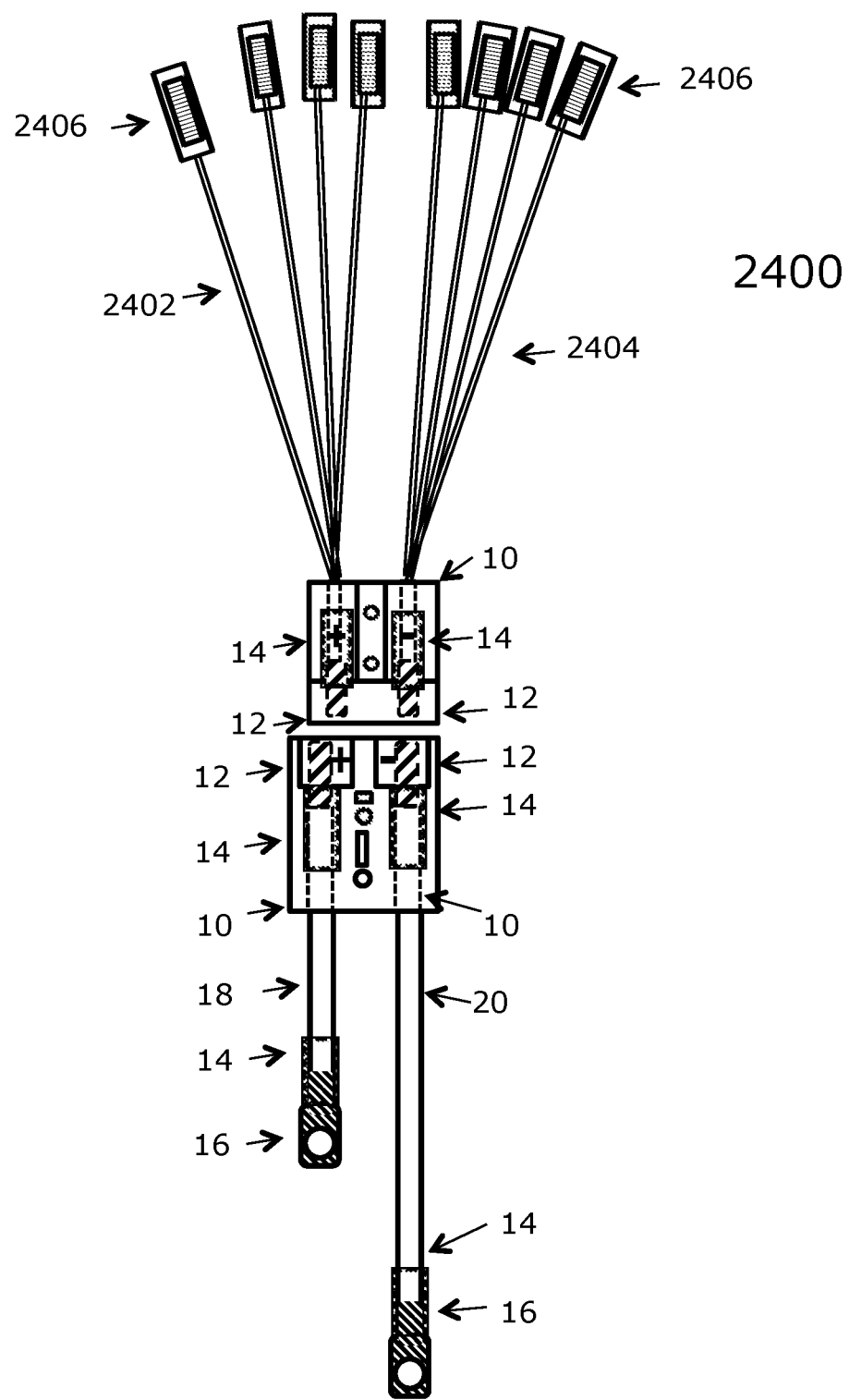
FIG. 24 illustrates a top down view of the disclosed multi-device connection system according to one embodiment of the present disclosure.
Figure 25:
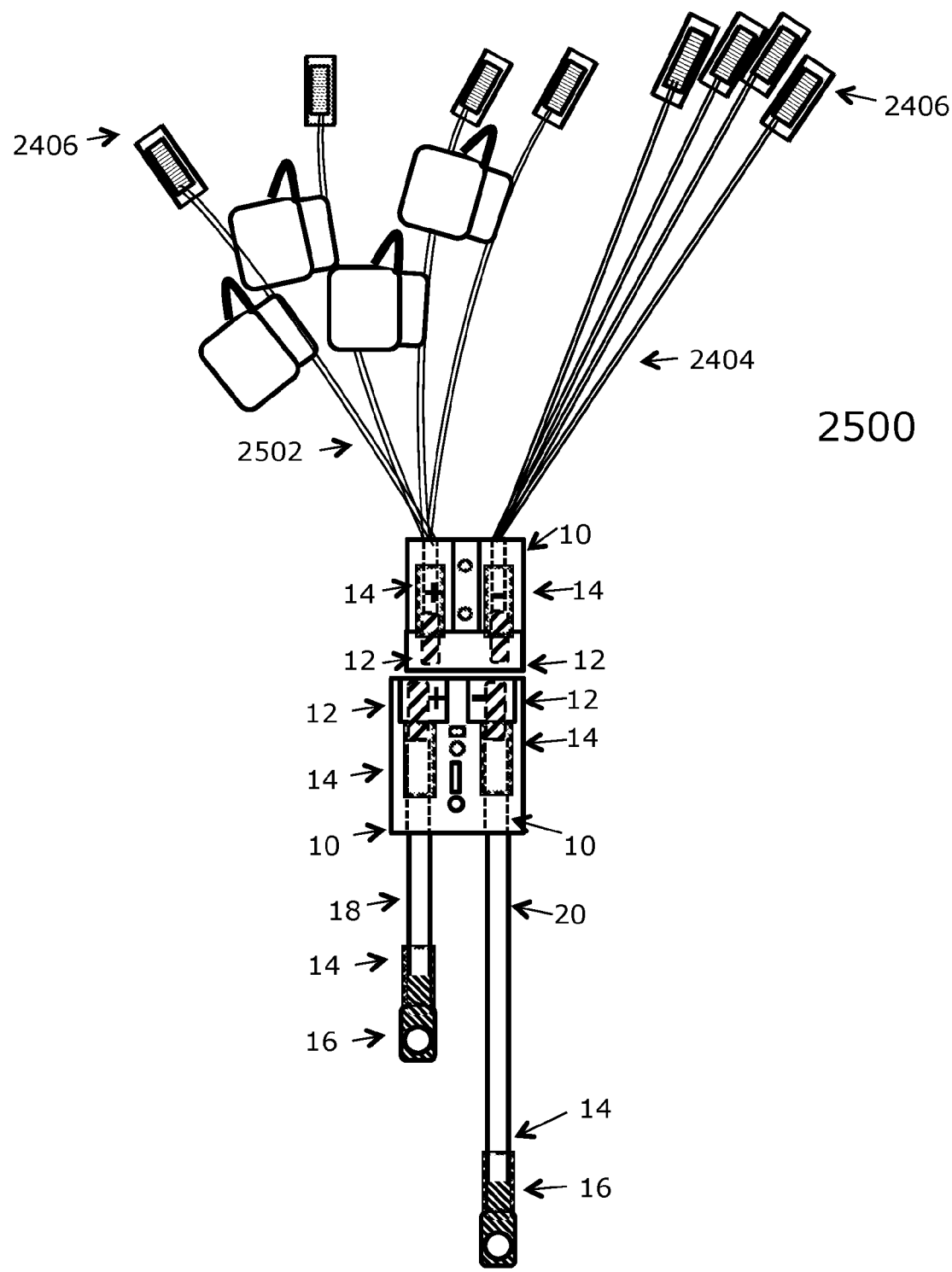
FIG. 25 illustrates a top down view of the disclosed multi-device connection system according to one embodiment of the present disclosure.
Figure 27:
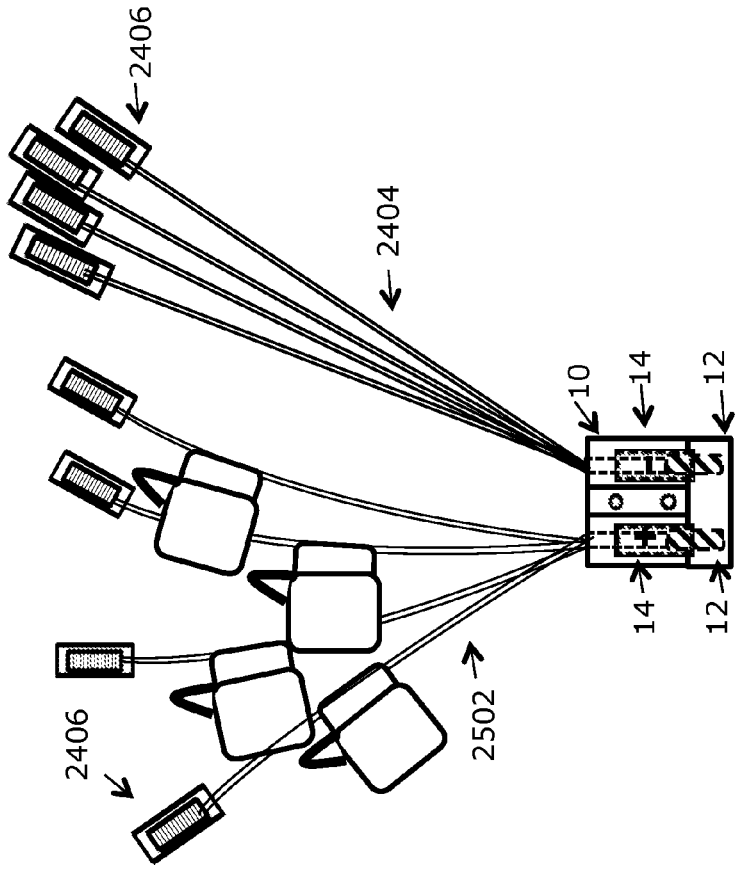
FIG. 27 illustrates a top down view of a multi-device connector according to one embodiment of the present disclosure.
Figure 26:
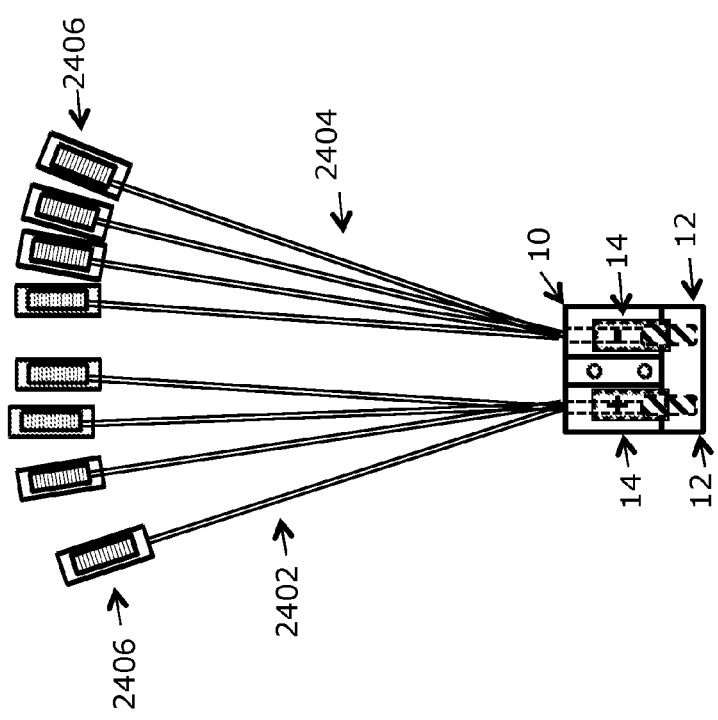
FIG. 26 illustrates a top down view of a multi-device connector according to one embodiment of the present disclosure.
Figure 28:
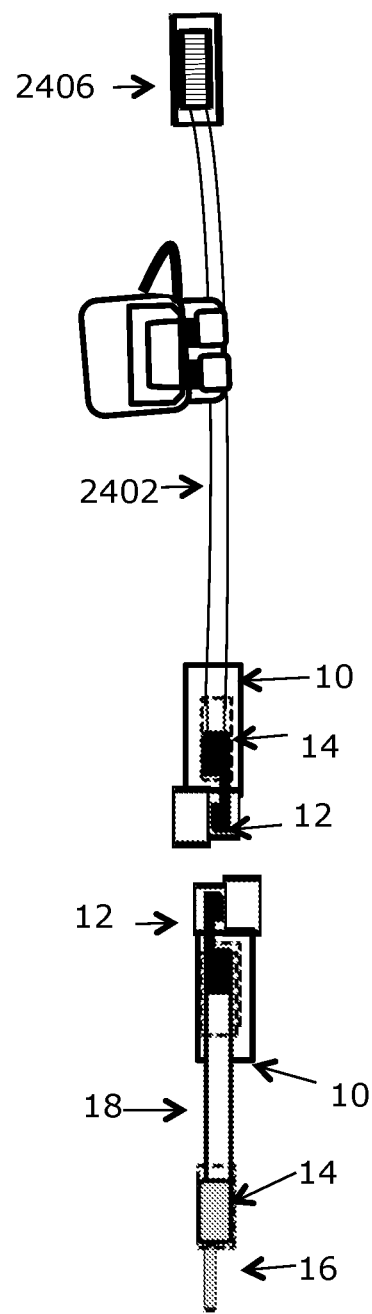
FIG. 28 illustrates a side view of a portion of a multi-device connector and a mated battery side connector according to one embodiment of the present disclosure.

In general, the disclosed multi-device connection system 2400, 2500 can convert one battery connection into a multi-device battery system by connecting a battery 32 to multiple devices in parallel. In one embodiment, as illustrated in FIGS. 24 and 25, the disclosed multi-device connection system 2400, 2500 generally includes a multi-device connector 2600, 2700, as illustrated in FIGS. 26 and 27, and a mated battery side connector 500, as illustrated in FIG. 5 and described above.

More specifically, in one embodiment, the multi-device connector 2600, 2700 includes a connection block 10, two or more positive, or red, wire leads 2402, 2502, each positive wire lead 2402, 2502 attached on one end to a wire terminal 2406 and on the other end, via a terminal connector 12 covered with shrink wire wrap 14, to the connection block 10, and two or more negative, or black, wire leads 2404, each negative wire lead 2404 attached on one end to a wire terminal 2406 and on the other end, via a terminal connector 12 covered with shrink wire wrap 14, to the connection block 10. In one embodiment, as illustrated in FIG. 27, the positive wire leads 2502 are fused together and each positive wire lead 2502 is attached to a fuse block. In another embodiment, each positive wire lead 2402 can be attached to an inline fuse holder, illustrated in FIG. 32.

In some embodiments, shrink wire wrap 14 is not used for one or more of the above-described connections. Further, the positive wire leads 2402, 2502 and the negative wire lead 2404 can be wire leads of other colors. More specifically, the wire leads 2402, 2502 and 2404 will have identifiable colors that indicate which color wire lead is the positive side wire lead that connects to the positive side and which color wire lead is the negative side wire lead that connects to the negative side, as required by local electrical codes. For example, instead of red and black, the positive wire leads 2402, 2502 can be brown and the negative wire lead 2404 can be grey, as required in the United Kingdom.

FIG. 6 illustrates how the system enables a user to efficiently, and safely, connect and disconnect several devices from the battery 32. For example, FIG. 6 illustrates a side view of a connection block 10 for the multi-device connector 2600, 2700 and a side view of a connection block 10 for the mated battery side connector 500, and shows how the two connection blocks 10 connect to each other. More specifically, the terminal connectors 12 are designed to stack on top of each other when the connection block 10 for the multi-device connector 2600, 2700 connects to the connection block 10 for the mated battery side connector 500. FIGS. 7 and 8 further illustrate how the terminal connectors 12 and the terminal connector slots 30 line up to permit easy connection of the connection blocks 10.

Figure 29:
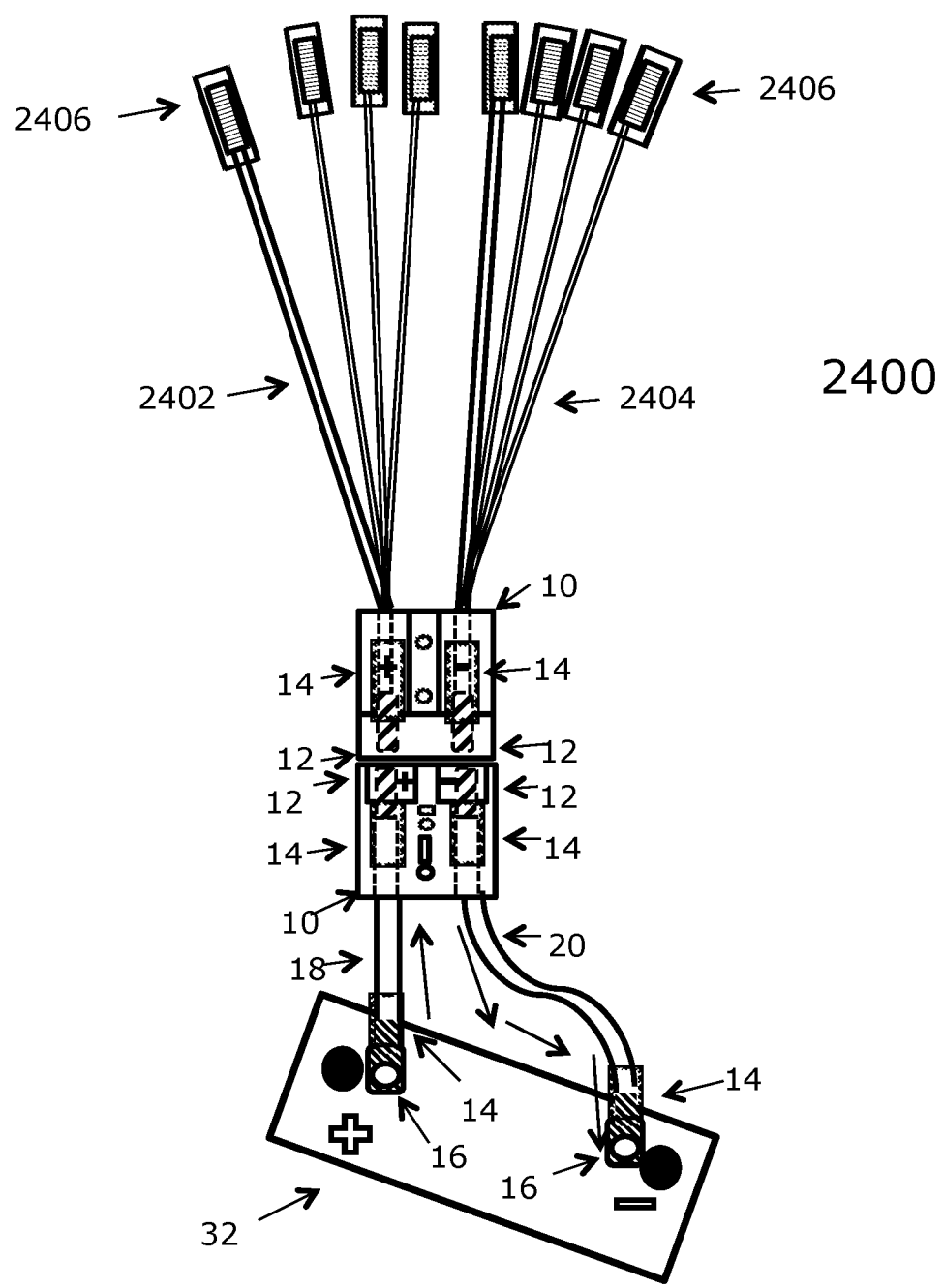
FIG. 29 illustrates a top down view of the disclosed multi-device connection system connected to a battery according to one embodiment of the present disclosure.
Figure 30:
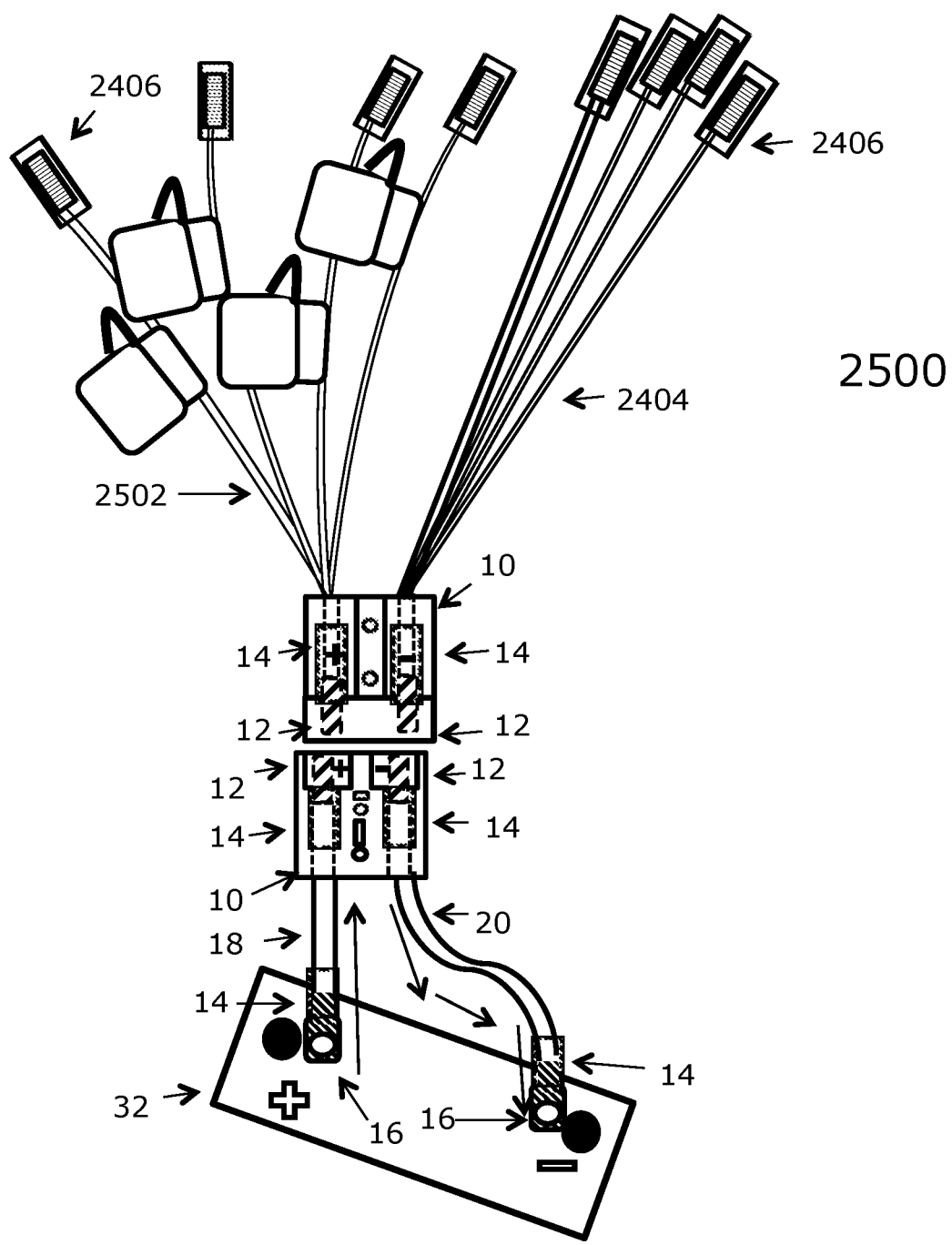
FIG. 30 illustrates a top down view of the disclosed multi-device connection system connected to a battery according to one embodiment of the present disclosure.

In one embodiment of the multi-device connection system 2400, 2500, the positive wire leads 2402, 2502 and the negative wire leads 2404 are of equal length and wire gauge. In another embodiment, they are of different lengths. However, regardless of the wire lengths relative to each other, both the positive wire leads 2402, 2502 and the negative wire leads 2404 can be any varying length as needed in application. As described above, the positive wire leads 2402, 2502 and the negative wire leads 2406 can each be connected to the same connection block 10. For example, a terminal connector 12 can be crimped to the ends of each wire lead and covered with, for example, shrink wire wrap 14, therefore sealing the wire leads to the terminal connectors 12. In some embodiments, shrink wire wrap 14 is not used. The sealed combination of the positive wire leads 2402, 2502 and terminal connectors 12 can then be inserted and locked into a terminal connector slot 30 on the positive terminal of the connection block 10. The sealed combination of the negative wire leads 2404 and terminal connectors 12 can also be inserted and locked into a terminal connector slot 30 on the negative terminal of the connection block 10. The ends of each wire lead that are not connected to a connection block 10 can be connected to a wire terminal 2406, as illustrated in FIG. 24 through 30. FIGS. 24, 26, and 29 illustrate a multi-device connection system 2400 wherein the positive wire leads 2402 can connect to multiple devices using non-fused wire leads. FIGS. 25, 27, and 30 illustrate a multi-device connection system 2500 wherein the positive wire leads 2502 can connect to multiple devices using fused wire leads. Given the electrical nature of the multi-device connection system 2400, 2500, in some embodiments, the system 2400, 2500 can be a sealed and/or waterproof system.

Therefore, the full connection setup for a multi-device connection system 2400, 2500 when connected to a battery 32 includes a mated battery side connector 500 with a first connection block 10 and connected to a battery 32 through the use of two terminal lug connectors 16, fused or non-fused positive wire leads 2402, 2502 connected to devices' power cables and the positive terminal of a second connection block 10, the negative wire leads 2404 connected to devices' power cables and the negative terminal of the second connection block 10, and the second connection block 10 of the multi-device connector 2600, 2700 paired and connected to the first connection block 10 of the mated battery side connector 500. Once these connections are made, the user has a fused or non-fused multi-device connection system. To disconnect the multi-device connector 2600, 2700 from the battery 32, a user can unplug the connection blocks 10 from each other.

Figure 31:
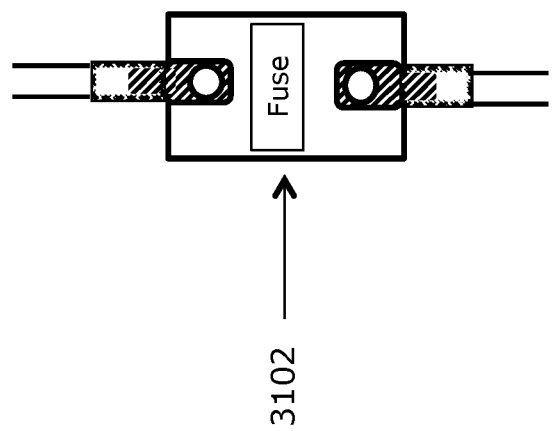
FIG. 31 illustrates an inline fuse according to one embodiment of the present disclosure.
Figure 32:
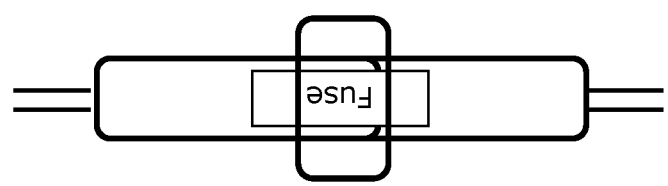
FIG. 32 illustrates an inline fuse according to one embodiment of the present disclosure.

In one embodiment, the disclosed multi-battery connection system is made of components using tinned marine wire, tinned copper-coated electrical terminals, 2:1 reduction wire protection shrink tape and a connection block 10. However, the various components of the multi-battery connection system 100, 200 and multi-device connection system 2400, 2500 can be made of different quality materials. Additionally, each connection systems 100, 200, 2000, 2100, 2400, 2500, 3300, 3400 can be integrated into a complete wire harness or can exist as a standalone unit, utilizing supplemental or integrated fuse protection, illustrated in FIGS. 31 and 32, to protect any attached devices. Further, the batteries 32 can maintain operation over extended periods of non-use through a battery maintainer/charger connection, which can be protected by an inline fuse as illustrated in FIG. 32.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A battery connection system for connecting first and last batteries together, each battery having a positive terminal and a negative terminal, the battery connection system comprising:
  a wire bridge system comprised of:
    a first and a last connection block aligned adjacent to each other, each having a positive terminal and a negative terminal;
    a positive wire lead;
    a negative wire lead; and
    a bridging wire; and
  at least two mated battery side connectors, wherein each is comprised of:
    a connection block having a positive terminal and a negative terminal;
    a positive wire; and
    a negative wire;
  wherein:
    the positive wire lead is secured on a first end to the positive terminal of the first connection block of the wire bridge system;
    the negative wire lead is secured on a first end to the negative terminal of the last connection block of the wire bridge system;
    the bridging wire connects the negative terminal of the first connection block of the wire bridge system to the positive terminal of the last connection block of the wire bridge system;
    the positive wire of a first of the at least two mated battery side connectors is enabled to attach the first connection block of the first mated battery side connector to the positive terminal of a first battery;

the negative wire of the first of the at least two mated battery side connectors is enabled to attach the first connection block of the first mated battery side connector to the negative terminal of the first battery;

the positive wire of a second of the at least two mated battery side connectors is enabled to attach the last connection block of the last mated battery side connector to the positive terminal of a second battery;

the negative wire of the second of the at least two mated battery side connectors is enabled to attach the last connection block of the last mated battery side connector to the negative terminal of the second battery; and the connection blocks of the wire bridge system removably connect to the connection blocks of the at least two mated battery side connectors.

2. The battery connection system of claim 1, further comprised of a third battery, wherein:

the wire bridge system is further comprised of:
   a middle connection block aligned between the first and the last connection blocks of the wire bridge system, the middle connection block having a positive terminal and a negative terminal; and
   an additional bridging wire;

the at least two mated battery side connectors includes a middle mated battery side connector, the middle mated battery side connector being comprised of:
   a middle connection block having a positive terminal and a negative terminal;
   an additional positive wire; and
   an additional negative wire;

the first and the last connection blocks of the wire bridge system comprise the end connection blocks of the wire bridge system;

the bridging wire connects at least one of the end connection blocks to the middle connection block of the wire bridge system;

the additional bridging wire connects the middle connection block of the wire bridge system to an adjacent connection block of the wire bridge system, wherein the adjacent connection block is comprised of at least one of the end connection blocks or an additional middle connection block of the wire bridge system;

the additional positive wire is enabled to attach the middle connection block of the middle mated battery side connector to a positive terminal of the third battery;

the additional negative wire is enabled to attach the middle connection block of the middle mated battery side connector to a negative terminal of the third battery; and the middle connection block of the wire bridge system removably connects to the middle connection block of the middle mated battery side connector.

3. The battery connection system of claim 2, further comprising a secondary connection system comprising:
   a first, secondary system positive wire lead secured to the first connection block of the wire bridge system;
   a first, secondary system negative wire lead secured to the first connection block of the wire bridge system;
   a middle, secondary system positive wire lead secured to the middle connection block of the wire bridge system;
   a middle, secondary system negative wire lead secured to the middle connection block of the wire bridge system;
   a last, secondary system positive wire lead secured to the last connection block of the wire bridge system; and
   a last, secondary system negative wire lead secured to the last connection block of the wire bridge system.

4. The battery connection system of claim 2, wherein the battery connection system further connects to a load by connecting the positive wire lead and the negative wire lead to the load.

5. The battery connection system of claim 1, further comprising a secondary connection system comprising:
   a first, secondary system positive wire lead secured to the first connection block of the wire bridge system;
   a first, secondary system negative wire lead secured to the first connection block of the wire bridge system;
   a last, secondary system positive wire lead secured to the last connection block of the wire bridge system; and
   a last, secondary system negative wire lead secured to the last connection block of the wire bridge system.

6. The battery connection system of claim 1, wherein the battery connection system removably connects to a load by connecting the positive wire lead and the negative wire lead to the load.

7. The battery connection system of claim 6, wherein the load is selected from the group consisting of a motor, an electric winch, a boatlift, electronics, lights, appliances, and combinations thereof.

8. The battery connection system of claim 2, further comprising a secondary connection system comprising:
   a first, secondary system positive wire lead secured to a first of the first, middle, or last connection blocks of the wire bridge system; and
   a first, secondary system negative wire lead secured to the first of the first, middle, or last connection blocks of the wire bridge system.

9. The battery connection system of claim 8, wherein the secondary connection system is further comprised of:
   a second, secondary system positive wire lead secured to a second of the first, middle, or last connection blocks of the wire bridge system; and
   a second, secondary system negative wire lead secured to the second of the first, middle, or last connection blocks of the wire bridge system.

10. The battery connection system of claim 1, further comprising a secondary connection system comprising:
   a first, secondary system positive wire lead secured to at least one of the first or last connection blocks of the wire bridge system; and
   a first, secondary system negative wire lead secured to the at least one of the first or last connection blocks of the wire bridge system.

11. A connection system for connecting a plurality of devices to a battery, the connection system comprising:
   a first connection block and a second connection block, each of the first and second connection blocks having a positive terminal and a negative terminal;
   at least four positive wire leads, each having a first end and a second end;
   at least four negative wire leads, each having a first end and a second end;
   a positive wire; and
   a negative wire;
   wherein:
      each positive wire lead is connected on its first end to the positive terminal of the first connection block;
      each negative wire lead is connected on its first end to the negative terminal of the first connection block;
      the positive wire is enabled to attach the second connection block to a positive terminal of a battery;
      the negative wire is enabled to attach the second connection block to a negative terminal of the battery; and the first connection block removably connects to the second connection block.

12. The connection system of claim 11, wherein the first ends of the positive wire leads are fused together.

13. The connection system of claim 12, wherein each positive wire lead is attached to a fuse block.

14. The connection system of claim 12, wherein each positive wire lead is attached to an inline fuse holder.

15. A battery connection system for connecting first and second batteries together, each battery having a positive terminal and a negative terminal, the battery connection system comprising:
  a wire bridge system comprised of:
    a first and a second connection block, each having a positive terminal and a negative terminal;
    a positive wire lead;
    a negative wire lead;
    a first bridging wire; and
    a second bridging wire; and
  at least two mated battery side connectors, wherein each is comprised of:
    a connection block having a positive terminal and a negative terminal;
    a positive wire; and
    a negative wire;
  wherein:
    the positive wire lead is secured on a first end to the first connection block of the wire bridge system;
    the negative wire lead is secured on a first end to the first connection block of the wire bridge system;
    the first bridging wire connects the positive terminal of the first connection block of the wire bridge system to the positive terminal of the second connection block of the wire bridge system;
    the second bridging wire connects the negative terminal of the first connection block of the wire bridge system to the negative terminal of the second connection block of the wire bridge system;
    the positive wire of a first of the at least two mated battery side connectors is enabled to attach the first connection block of the first mated battery side connector to the positive terminal of a first battery;
    the negative wire of the first of the at least two mated battery side connectors is enabled to attach the first connection block of the first mated battery side connector to the negative terminal of the first battery;
    the positive wire of a second of the at least two mated battery side connectors is enabled to attach the second connection block of the second mated battery side connector to the positive terminal of a second battery;
    the negative wire of the second of the at least two mated battery side connectors is enabled to attach the second connection block of the second mated battery side connector to the negative terminal of the second battery; and
    the connection blocks of the wire bridge system removably connect to the connection blocks of the at least two mated battery side connectors.

16. The battery connection system of claim 15, wherein the battery connection system removably connects to a load by connecting the positive wire lead and the negative wire lead to the load.

17. The battery connection system of claim 15, further comprised of a third battery, wherein:
  the wire bridge system is further comprised of:
    a third connection block having a positive terminal and a negative terminal;
    a first, additional bridging wire; and
    a second, additional bridging wire;
  the at least two mated battery side connectors includes a third mated battery side connector, the third mated battery side connector being comprised of:
    a third connection block having a positive terminal and a negative terminal;
    a third positive wire; and
    a third negative wire;
  the first, additional bridging wire connects the positive terminal of the second connection block of the wire bridge system to the positive terminal of the third connection block of the wire bridge system;
  the second, additional bridging wire connects the negative terminal of the second connection block of the wire bridge system to the negative terminal of the third connection block of the wire bridge system;
  the third positive wire is enabled to attach the third connection block of the third mated battery side connector to a positive terminal of the third battery;
  the third negative wire is enabled to attach the third connection block of the third mated battery side connector to a negative terminal of the third battery; and
  the third connection block of the wire bridge system removably connects to the third connection block of the third mated battery side connector.

18. The battery connection system of claim 17, wherein the battery connection system removably connects to a load by connecting the positive wire lead and the negative wire lead to the load.

* * * * *